United States Patent
Mandal et al.

(10) Patent No.: US 7,526,593 B2
(45) Date of Patent: Apr. 28, 2009

(54) PACKET COMBINER FOR A PACKETIZED BUS WITH DYNAMIC HOLDOFF TIME

(75) Inventors: Manas Mandal, Palo Alto, CA (US);
William P. Tsu, San Jose, CA (US);
Colyn S. Case, Hyde Park, VT (US);
Ashish Kishen Kaul, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 261 days.

(21) Appl. No.: 11/538,399

(22) Filed: Oct. 3, 2006

(65) Prior Publication Data

US 2007/0079044 A1 Apr. 5, 2007

Related U.S. Application Data

(63) Continuation-in-part of application No. 11/179,266, filed on Jul. 11, 2005.

(51) Int. Cl.
*G06F 13/36* (2006.01)
*G06F 13/00* (2006.01)

(52) U.S. Cl. .................... 710/310; 710/35; 370/473; 370/474; 370/393; 370/465

(58) Field of Classification Search ................ 710/322; 370/465, 473, 393
See application file for complete search history.

(56) References Cited

U.S. PATENT DOCUMENTS

| | | | |
|---|---|---|---|
| 5,918,072 A | 6/1999 | Bhattacharya | |
| 6,101,568 A * | 8/2000 | Richardson | 710/310 |
| 6,304,550 B1 | 10/2001 | Fox | |
| 6,405,276 B1 * | 6/2002 | Chen et al. | 710/310 |
| 6,462,998 B1 | 10/2002 | Proebsting | |
| 6,546,447 B1 * | 4/2003 | Buckland et al. | 710/306 |
| 6,665,756 B2 | 12/2003 | Abramson et al. | |
| 6,721,334 B1 | 4/2004 | Ketcham | |
| 6,804,251 B1 | 10/2004 | Limb et al. | |
| 6,973,055 B1 | 12/2005 | Du | |
| 7,000,041 B2 | 2/2006 | Creta et al. | |
| 7,000,060 B2 | 2/2006 | Shah et al. | |
| 7,054,935 B2 | 5/2006 | Farber et al. | |
| 7,079,501 B2 | 7/2006 | Boivie | |

(Continued)

OTHER PUBLICATIONS

Brewer, Jim et al., "PCI Express Technology," Dell White Paper, Feb. 2004, 11 pgs.

(Continued)

*Primary Examiner*—Paul R Myers
*Assistant Examiner*—Brian T Misiura
(74) *Attorney, Agent, or Firm*—Townsend and Townsend and Crew LLP

(57) ABSTRACT

Multiple data transfer requests can be merged and transmitted as a single packet on a packetized bus such as a PCI Express (PCI-E) bus. In one embodiment, requests are combined if they are directed to contiguous address ranges in the same target device. An opportunistic merging procedure is advantageously used that merges a first request with a later request if the first request and the later request are mergeable and are received within a holdoff period that is dynamically determined based on a level of bus activity; otherwise, requests can be transmitted without merging.

20 Claims, 9 Drawing Sheets

U.S. PATENT DOCUMENTS

| | | | |
|---|---|---|---|
| 7,133,943 | B2 | 11/2006 | Carnevale et al. |
| 7,170,893 | B2 * | 1/2007 | Rajan et al. .................. 370/393 |
| 7,391,769 | B2 * | 6/2008 | Rajkumar et al. ........... 370/389 |
| 2003/0147411 | A1 | 8/2003 | Goosman |
| 2004/0003164 | A1 | 1/2004 | Boily |
| 2004/0165541 | A1 * | 8/2004 | Scholte ....................... 370/252 |
| 2004/0205270 | A1 | 10/2004 | Creta |
| 2004/0233933 | A1 * | 11/2004 | Munguia .................... 370/473 |
| 2004/0252721 | A1 | 12/2004 | Lingafelt et al. |
| 2005/0157756 | A1 * | 7/2005 | Ormond ..................... 370/474 |
| 2005/0198334 | A1 | 9/2005 | Farber et al. |
| 2005/0201383 | A1 * | 9/2005 | Bhandari et al. ....... 370/395.42 |
| 2006/0072615 | A1 * | 4/2006 | Narad et al. ................ 370/474 |
| 2007/0064729 | A1 * | 3/2007 | Rodrigo et al. ............. 370/468 |

OTHER PUBLICATIONS

Bhatt, Ajay V., "Creating a third generation I/O interconnect," Intel Developer Network for PCI express architecture as downloaded from the internet http://www.intel.com/technology/pciexpress/devnet/docs/WhatisPCIExpress.pdf on Aug. 29, 2005.

* cited by examiner

PACKET COMBINER FOR A PACKETIZED BUS WITH DYNAMIC HOLDOFF TIME

BACKGROUND OF THE INVENTION

This application is a continuation-in-part of application Ser. No. 11/179,266, filed Jul. 11, 2005, titled "Combining Packets for a Packetized Bus," which disclosure is incorporated herein by reference for all purposes.

BACKGROUND OF THE INVENTION

The present invention relates in general to communication on a bus, and in particular to combining packets for transmission onto a bus that uses a packetized protocol.

Modern personal computer systems generally include a number of different devices, including processors, memory, data storage devices using magnetic or optical media, user input devices such as keyboards and mice, output devices such as monitors and printers, graphics accelerators, and so on. All of these devices communicate with each other via various buses implemented on a motherboard of the system. Numerous bus protocols are known, including PCI (Peripheral Component Interconnect), PCI-E (PCI Express), AGP (Advanced Graphics Processing), HyperTransport, and so on. Each bus protocol specifies the physical and electrical characteristics of the connections, as well as the format for transferring information via the bus. In many instances, the buses of a personal computer system are segmented, with different segments sometimes using different bus protocols, and the system includes bridge chips that interconnect different segments.

Typically, buses are used to exchange data between system components. For instance, when a graphics processor needs to read texture or vertex data stored in system memory, the graphics processor requests the data via a bus and receives a response via the same bus. Where many devices are making requests for data (e.g., from system memory) or where one device is making large or frequent requests, a bus or bus segment can become saturated, leading to decreased performance. In fact, many modern graphics processors are bandwidth-limited; that is, their performance is limited by the ability to deliver data via the bus that connects them to the rest of the system. Consequently, reducing traffic on the bus, which increases the available bandwidth, is expected to improve system performance. Techniques that reduce traffic on the bus would therefore be highly desirable.

BRIEF SUMMARY OF THE INVENTION

Embodiments of the present invention provide devices and methods for merging multiple data transfer requests and transmitting the merged requests as a single packet on a packetized bus such as a PCI Express (PCI-E) bus. Requests can be combined, for instance, if they are directed to contiguous address ranges in the same target device. An opportunistic merging procedure is advantageously used that merges a first request with a later request if the first request and the later request are mergeable and are received within a certain period of time; otherwise, requests can be transmitted without merging. The wait time (also referred to herein as "holdoff time") and other parameters of the procedure can be tuned to optimize tradeoffs between reduced overhead on the bus due to merging and added latency introduced by waiting for mergeable requests. In some embodiments, such tradeoffs can be optimized by dynamically adjusting the holdoff time based on bus activity.

According to one aspect of the present invention, a bus interface device for transmitting data transfer requests (e.g., read requests or write requests) from multiple clients as packets on a bus includes a queue, control logic, packet forming logic, output logic, and dynamic holdoff timer logic. The queue is configured to store data transfer requests from the clients, each data transfer request specifying a target address range. The control logic is configured to generate a send condition signal. The packet forming logic is configured to form a packet, in response to the send condition signal, from at least one of the data transfer requests in the queue. The packet forming logic is also configured to combine two or more of the data transfer requests in the queue into one packet in the event that the two or more data transfer requests being combined specify respective target address ranges that are mergeable (e.g., contiguous or overlapping). The output logic, which is coupled to the packet forming logic, is configured to drive the packet onto the bus. The dynamic holdoff timer logic, which is coupled to the packet forming logic and the control logic, is configured to determine a holdoff period for a next packet based on a level of bus activity and to detect expiration of the holdoff period. The control logic is configured to generate the send condition signal in response to expiration of the holdoff period.

In some embodiments, the dynamic holdoff timer logic is configured to receive size information for a formed packet from the packet forming logic and to dynamically update the holdoff period for the next packet based at least in part on the size information. For instance, if the data transfer requests are read requests, the size information may represent an amount of data requested by the formed packet. The holdoff period for the next packet may be based at least in part on a return transfer time associated with the amount of data requested by the formed packet. As another example, if the data transfer requests are write requests, the size information may represent an amount of write data included in the formed packet. The holdoff period for the next packet may be based at least in part on a transfer time associated with the amount of write data included in the formed packet.

In some embodiments, the bus interface device also includes unmergeable request detection logic coupled to the queue and the control logic. The unmergeable request detection logic can be configured to determine whether an oldest data transfer request in the queue satisfies an unmergeability criterion, and the control logic can be configured to generate the send condition signal in the event that the oldest data transfer request satisfies the unmergeability criterion. An unmergeability criterion can be any criterion based on a property of the request, including but not limited to an amount of data requested to be transferred, a target device of the request, a target address range of the request, and so on.

According to another aspect of the present invention, a method for transmitting data transfer requests from a plurality of clients as packets on a bus includes receiving a first data transfer request specifying a first address range and thereafter detecting whether a dynamically adjustable holdoff time has elapsed since receiving the first packet. If the holdoff time has elapsed, a packet is formed for transmission on the bus. To form the packet, it is determined whether a subsequent data transfer request specifying a second address range mergeable with the first address range was received during the holdoff time. If so, then the first data transfer request and the mergeable subsequent data transfer request are merged into the packet; if not, then only the first data transfer request is included in the packet. The packet (which may include one or more requests) is transmitted onto the bus. Based on a level of bus activity, the holdoff time for a next packet to be formed is adjusted.

In some embodiments, adjusting the holdoff time includes determining a delay time associated with communication via the bus of a response to the first packet and adding the delay time to a current holdoff time, thereby adjusting the holdoff time. The delay time can be determined based at least in part on an amount of time required to transfer the amount of data associated with the request via the bus. For instance, if the first packet includes at least one read request, the delay time might be determined based at least in part on an amount of time needed to transfer a response packet including the requested data via the bus. As another example, if the first packet includes at least one write request, the delay time can be determined based at least in part on an amount of time needed to transfer the write data via the bus.

In some embodiments, detecting whether the holdoff time has elapsed includes decrementing the holdoff time for each cycle of a clock associated with the bus and detecting whether the holdoff time is zero. Further, in some embodiments, the holdoff time is considered as having elapsed only when the holdoff time is zero and the bus is available to transmit a request.

According to yet another aspect of the present invention, a processor includes multiple processing cores configured to generate data transfer requests and a bus interface unit configured to receive data transfer requests from the processing cores and to transmit the data transfer requests as packets on a bus. The bus interface unit includes a queue, control logic, packet forming logic, output logic, and dynamic holdoff timer logic. The queue is configured to store data transfer requests from the clients, each data transfer request specifying a target address range. The control logic is configured to generate a send condition signal. The packet forming logic is configured to form a packet, in response to the send condition signal, from at least one of the data transfer requests in the queue. The packet forming logic is also configured to combine two or more of the data transfer requests in the queue into one packet in the event that the two or more data transfer requests being combined specify respective target address ranges that are mergeable (e.g., contiguous or overlapping). The output logic, which is coupled to the packet forming logic, is configured to drive the packet onto the bus. The dynamic holdoff timer logic, which is coupled to the packet forming logic and the control logic, is configured to determine a holdoff period for a next packet based on a level of bus activity and to detect expiration of the holdoff period. The control logic is configured to generate the send condition signal in response to expiration of the holdoff period. In one embodiment, the processor is a graphics processor and the bus interface unit is configured for use with a PCI-Express (PCI-E) bus, but other processors and buses (or communication links) may be used.

The following detailed description together with the accompanying drawings will provide a better understanding of the nature and advantages of the present invention.

DETAILED DESCRIPTION OF THE INVENTION

Embodiments of the present invention provide devices and methods for combining two or more data transfer requests into a single packet for transmission onto a packetized bus such as a PCI Express (PCI-E) bus. As used herein, a "packetized" bus includes any bus via which data transfer requests are transmitted using packets with a header (generally although not necessarily of fixed size) and a payload of variable size. The header advantageously identifies the requesting device and the target address range. Target address ranges can be identified by starting and ending addresses, by starting address and size, or the like. In some instances, the target device may be expressly identified; in other instances, the target address range adequately identifies the target device in accordance with address mapping rules, and an explicit identification of a target device is not required. Requests can be combined by the bus interface unit of an integrated device that includes multiple request generators, by a discrete bus interface element such as a switch, or by other devices as will become apparent in view of the present disclosure. Combining multiple requests into a single packet reduces the overhead on the bus arising from multiple packet headers. In some embodiments, the reduced overhead can provide increased bandwidth for data and/or other performance advantages, examples of which are described below.

Figure 1:
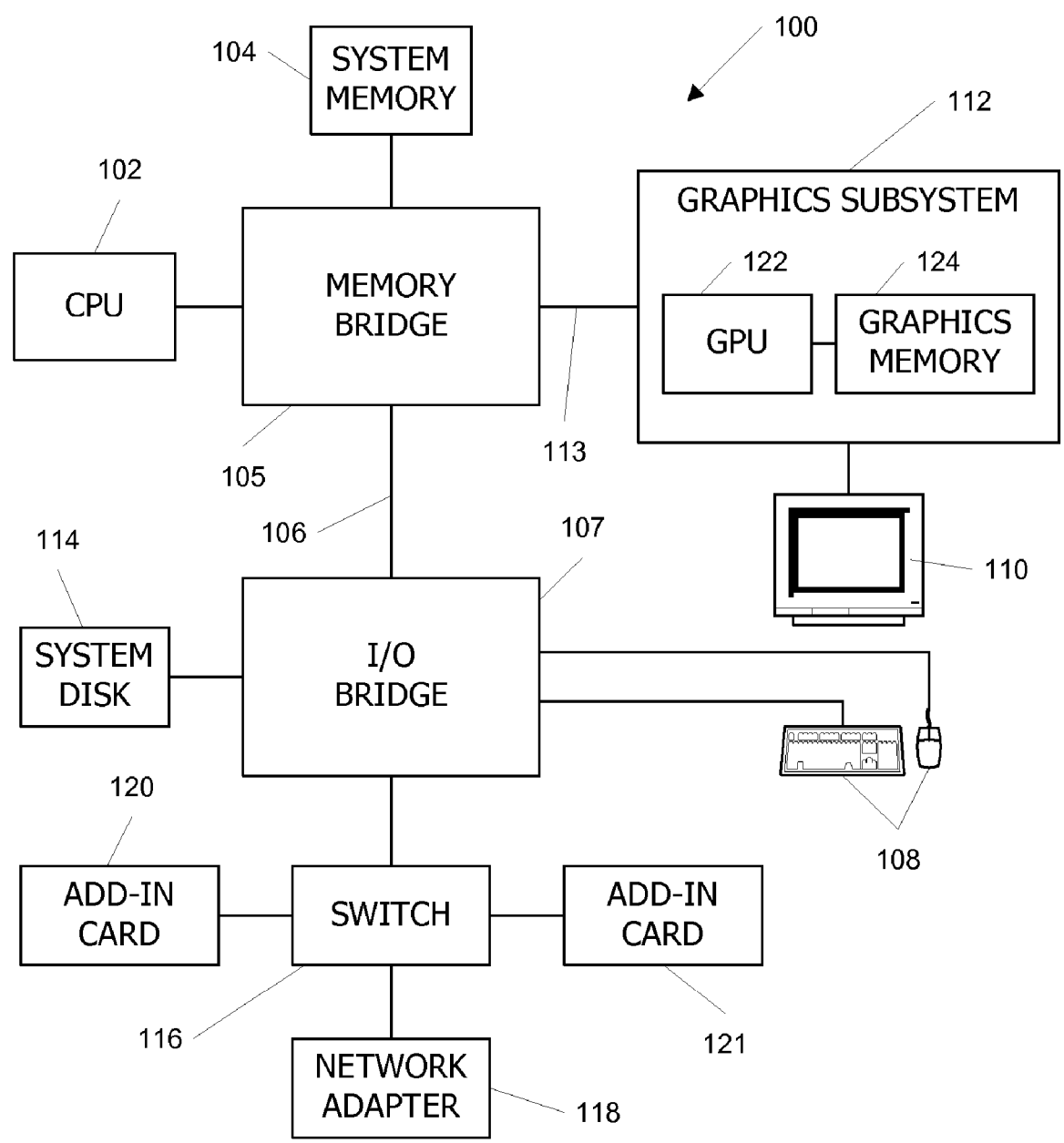
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a memory bridge 105. Memory bridge 105 is connected via a bus 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. In preferred embodiments, some or all of the connections among various components of system 100—e.g., between memory bridge 105 and graphics subsystem 112, between memory bridge 105 and I/O bridge 107, and between I/O bridge 107 and switch 116—are implemented using a packetized bus protocol such as PCI-Express (PCI-E). (As is known in the art, in PCI-E devices are interconnected using dedicated point-to-point links between each device and a bridge or switch, rather than shared links among multiple devices as the term "bus" traditionally connotes. PCI-E is referred to herein and elsewhere in the art as a "bus" in the sense that it can be substituted for a traditional shared-path bus in a computer system.)

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 advantageously also includes a scanout pipeline for delivering pixel data from graphics memory 124 to display device 110. Any combination of rendering and scanout operations can be implemented in GPU 122, and a detailed description is omitted as not being critical to understanding the present invention.

It will be appreciated that the system shown herein is illustrative and that variations and modifications are possible. The number and arrangement of bus devices and bridges may be modified as desired; for instance, a graphics subsystem could be connected to I/O bridge 107 rather than memory bridge 105, or I/O bridge 107 and memory bridge 105 might be integrated into a single chip. Alternatively, a graphics subsystem could be integrated on a single chip with a bus bridge. The bus topology may also be varied; for instance, in one alternative embodiment, the system memory is connected to the CPU directly rather than through a bridge.

Any number of graphics processors may be included (e.g., by connecting multiple add-in cards with a graphics processor on each to bus 113), and such processors may be operated in parallel to generate images for the same display device or for different display devices. Each graphics processor may have any amount of local graphics memory, including no local memory, and a graphics processor may use local memory and system memory in any combination.

Figure 2:
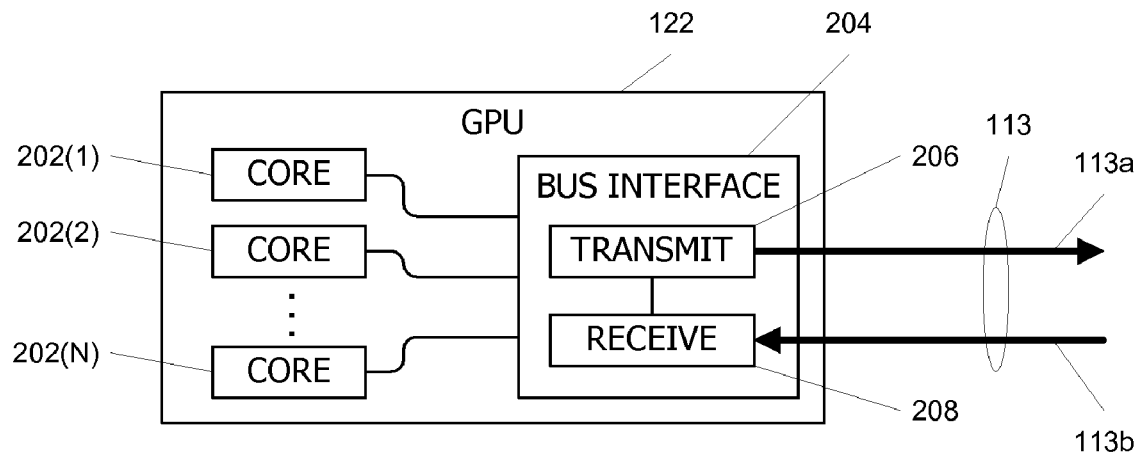
FIG. 2 is a block diagram of a graphics processing unit according to an embodiment of the present invention.

FIG. 2 is a block diagram of GPU 122 according to an embodiment of the present invention. GPU 122 includes multiple execution cores 202(1) to 202(N) that operate in parallel to perform rendering and/or scanout operations. In one embodiment, one of cores 202(1) to 202(N) performs scanout operations while the other cores perform rendering operations; it will be appreciated that other configurations may be used. Any number N of cores may be provided, and each core may be of generally conventional design.

From time to time in the course of their operations, cores 202(1) to 202(N) may require data to be retrieved from system memory 104 (FIG. 1) or other devices that are accessible to GPU 122 via memory bridge 105. In accordance with an embodiment of the present invention, cores 202(1) to 202(N) forward such requests to a bus interface unit 204. Bus interface unit 204 includes a transmitter module 206 and a receiver module 208. Transmitter module 206, an embodiment of which is described below, forwards requests received from the cores to bus 113. Receiver module 208 receives responses to the requests via bus 113 and forwards each response to the requesting one of cores 202(1) to 202(N).

In preferred embodiments, the bus is a "packetized" bus, meaning that information is transferred using packets that may vary in size. In the case of data transfer requests, each packet includes a header of fixed size (e.g., 20 bytes) that identifies the requesting device, the target device, and a target address or address range (within the target device) to or from which data is to be transferred. In some embodiments, addresses are defined in a "global" address space that is shared among multiple devices, and the target address range alone suffices to identify a target device; in such instances, a separate identifier of the target device may be omitted. Similarly, in embodiments where multiple address spaces are defined (e.g., I/O space, memory space, configuration space and so on) and portions of each space are assigned to specific target devices, the target device may be identified by specifying a target address space and a target address range within that space. The target address range can be specified using starting and ending addresses, or a starting address and size, or the like.

The header advantageously also includes other information, such as the type of operation (e.g., read or write) that is to be performed, packet priority, a packet serial number or other unique identifier (referred to herein as a "tag") provided by the requesting device, and so on. In the case of a write operation, a request packet advantageously also has a "payload" portion that includes the data to be written. In the case of a read operation, the payload portion of the request packet is advantageously omitted. Numerous packet formats are known in the art, and a detailed description is omitted as not being critical to understanding the present invention. In one embodiment, the packets conform to the PCI-E protocol.

Where the packet requested a read operation, the target device advantageously returns a response packet whose payload portion includes the requested data. The header of the response packet identifies the requesting device and includes the tag from the corresponding request packet to facilitate identification of the data. In the case of a write operation, a response packet might not be sent.

In some embodiments, the target device of each read request or write request packet returns an acknowledgement ("Ack") to the device that sent the request. An Ack, which is separate from any data transfer, may be a small packet that simply indicates successful receipt of the request packet, e.g., by returning the tag associated with the request packet. In the case of a read request, the target device would return an Ack upon receipt of the request packet and (after an applicable read latency period) the requested data in a separate packet. The requesting device would then send an Ack back to the target device to indicate receipt of the data packet. In the case of a write request, the target device would return an Ack upon receipt of the request packet and might or might not return a separate packet indicating completion of the write operation. In one embodiment, Acks also conform to the PCI-E protocol.

Transmitter module 206 advantageously provides receiver 208 the unique tag for each request packet sent and also provides receiver 208 information about which core 202(1)-202(N) originated the request. Receiver 208 matches request tags in the headers of incoming response packets to the request tags provided by transmitter module 206 and uses that information to direct the response to the originating one of cores 202(1)-202(N).

In some instances, other devices in system 100 (FIG. 1) may request a data transfer to or from graphics processing subsystem 112, e.g., to or from graphics memory 124. In this situation, receiver 208 receives an incoming request packet via bus 113 and forwards the request to an appropriate handler within graphics processing subsystem 112. The handler may be, e.g., one of cores 202(1) to 202(N) or a separate graphics memory interface module (not shown in FIG. 2). The response (data or Ack) is returned from the handler to transmitter module 206, which formats and sends a response packet to the requesting device via bus 113.

Packets are not limited to data transfer requests and responses. In some embodiments, packets may also be used to deliver various messages (e.g., interrupts, resets, and the like) between system components, in addition to data transfer requests and responses.

In one embodiment, bus 113 is a PCI-E bus, with separate physical paths 113a, 113b for sending packets and receiving packets, respectively, as shown in FIG. 2. It will be appreciated that other packetized buses could be substituted, with or without separate sending and receiving paths, and the present invention is not limited to PCI-E.

In accordance with an embodiment of the present invention, when cores 202(1) to 202(N) generate data transfer requests, transmitter unit 206 can combine multiple requests into a single packet to be transmitted on bus 113. Packets are advantageously combined if they reference contiguous address ranges in the same device and specify the same type of operation (e.g., read or write).

Figure 3:
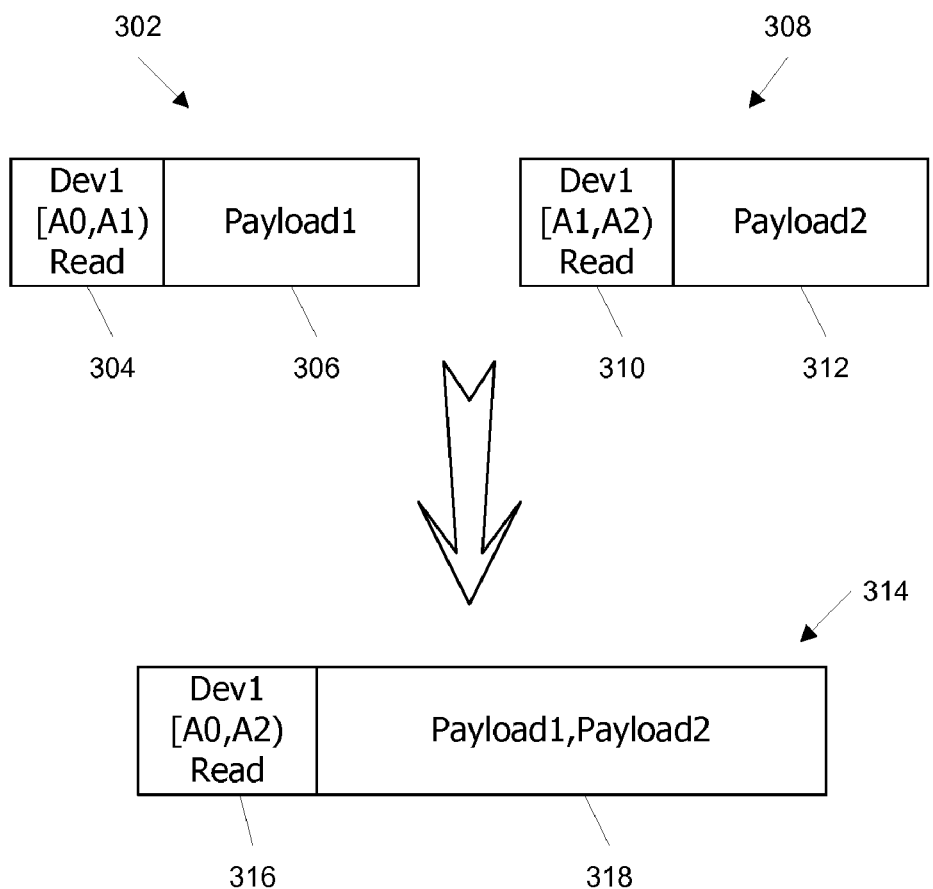
FIG. 3 illustrates an operating principle for combining packets according to an embodiment of the present invention.

FIG. 3 illustrates an operating principle for combining packets. Packet 302 has a header portion 304 and a payload portion 306 (which may be empty). Header portion 304 specifies a device (Dev1), an address range [A0, A1), and an operation (Read). Herein, address ranges are specified in a linear address space using half-open intervals [Aa, Ab) where a<b, denoting that the first address in the range is Aa and the last address is the largest valid address value that is less than Ab. Address indices are ordered such that if a<b, address Aa is lower than address Ab in the linear address space; thus, it is to be understood that A0<A1<A2 and so on. The spacing between addresses is arbitrary and may be varied; for instance, A0 and A1 might be 64 addresses apart while A1 and A2 are 32 addresses apart. Those of ordinary skill in the art with access to the present teachings will be able to adapt the embodiments described herein to other address spaces.

Similarly, packet 308 has a header portion 310 and a payload portion 312 (which may also be empty). Header portion 310 specifies the same device (Dev1) and an address range [A1, A2). Packets 302 and 308 reference contiguous address ranges in the same device and specify the same type of operation. In accordance with an embodiment of the present invention, these packets can be combined into a new packet 314. Header portion 316 of packet 314 specifies the device (Dev1), the combined address range [A0, A2), and the operation (Read). Payload portion 318 of packet 314 contains the concatenated payloads of packets 302 and 308.

In some embodiments, packet headers have the same size regardless of payload size. For instance, header 316 is the same size as either one of headers 304 and 310. Sending combined packet 314 rather than individual packets 302 and 308 reduces the bandwidth used by the size of one header. This can result in a substantial savings. For instance, in one embodiment using PCI-E, each packet header is 20 bytes, and the payload might be 16, 32, 64 or 128 bytes. If two 64-byte payloads are merged into one 128-byte payload, the effective bandwidth is increased by about 13.5%. This is a significant efficiency gain in situations where a bus device is bandwidth limited, as is often the case for GPUs. More generally, as long as the combined packet 314 is smaller than the two packets 302, 308, combining the packets results in some reduction in bus bandwidth usage and, particularly in instances where the bus device is bandwidth limited, some improvement in performance.

Further, it should be noted that where the data transfer request is a read request, combining packets can reduce header overhead in both directions, as the response to each request packet would be sent as a separate packet. For instance, in FIG. 3, if the target device received packets 302 and 308 via a PCI-E bus, it would generate two response packets to deliver the requested data, but if the target device received packet 314, it would generate only one response packet. In addition, in embodiments using PCI-E or other protocols in which the target device sends an Ack for each packet received, combining packets can reduce the number of Acks that need to be sent, further reducing overhead on the bus.

In some embodiments, in instances where transmitter module 206 is transmitting response packets, combining packets might not be appropriate. For instance, PCI-E requires that a target device return at least one packet for every received request packet; accordingly, where a PCI-E device is acting as a target device, transmitter 206 would not combine packets generated in response to a request. Those of ordinary skill in the art will appreciate that transmitter module 206 can be configured to distinguish request packets from other types of packets and to perform combining operations only for request packets.

In instances where transmitter module 206 is transmitting request packets, any requests and any number of requests can be combined into a single packet as long as the target device is able to respond to the request. In some embodiments, requests from different cores 202 can be combined by transmitter 206. Where the request is a read request, transmitter 206 advantageously provides to receiver module 208 information indicating which core 202 requested which portion of the data in the combined request; given such information, receiver module 208 can direct the correct portion of the returned data to the correct client.

Figure 4:
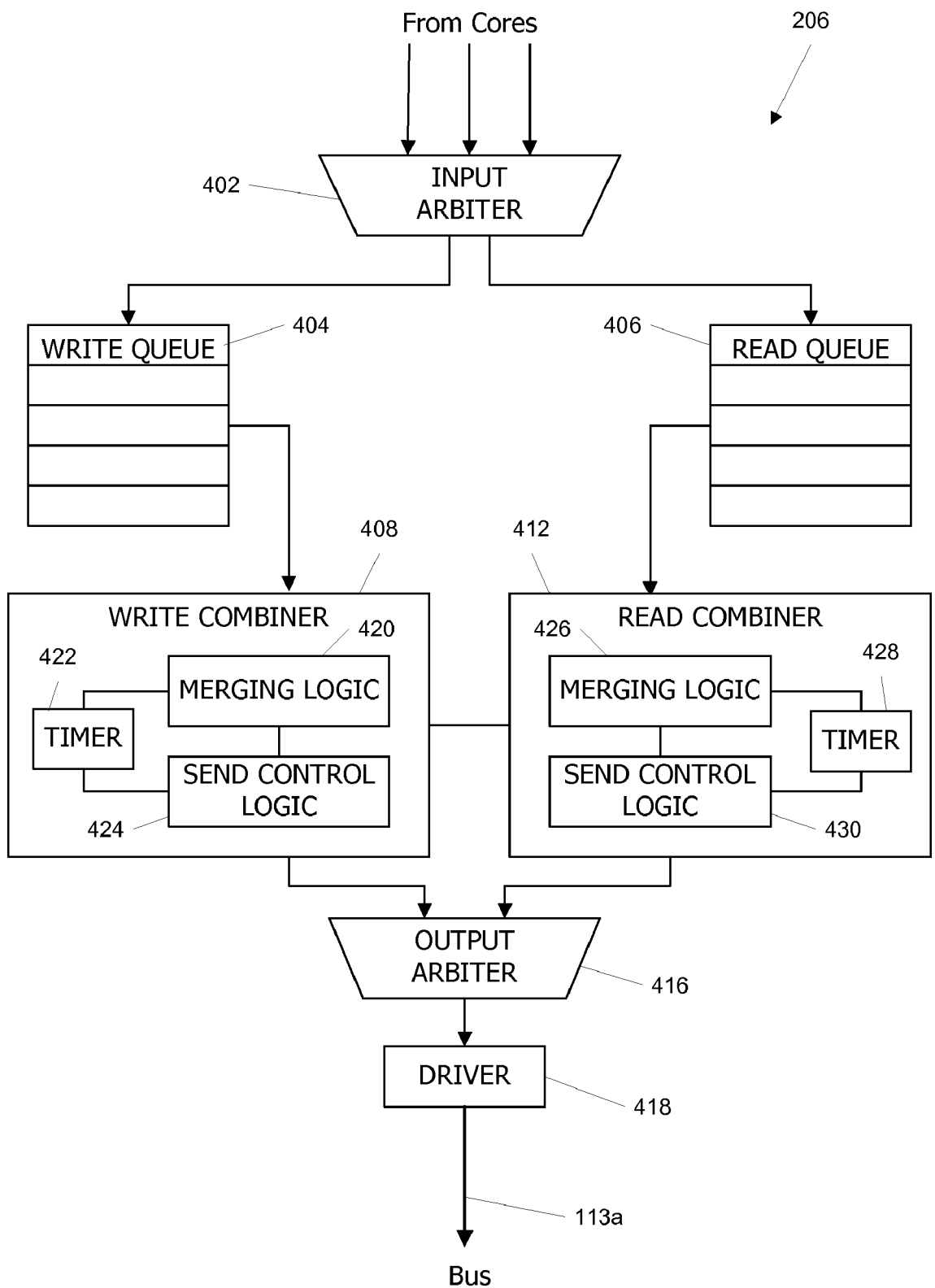
FIG. 4 is a block diagram of a transmitter module that combines and transmits packets according to an embodiment of the present invention.

FIG. 4 is a block diagram of transmitter module 206 according to an embodiment of the present invention. Transmitter module 206 includes an input arbiter 402, a write queue 404 for temporarily storing write requests, a read queue 406 for temporarily storing read requests, a write combiner 408, a read combiner 412, an output arbiter 416, and a driver circuit 418 coupled to outgoing data path 113a of bus 113.

Input arbiter 402 receives data transfer requests, including read and write requests, from cores 202(1) to 202(N). In some embodiments, the cores send requests to transmitter module 206 in the packet format specified by the bus protocol; in other embodiments, the requests are sent using a different data format and are converted to the appropriate packet format within transmitter module 206.

Input arbiter 402 directs write requests to write queue 404 and read requests to read queue 406. Since multiple cores may make requests at the same time, input arbiter 402 advantageously includes control logic for arbitrating among simultaneous requests. Conventional arbitration or scheduling rules such as round-robin, priority-based arbitration, or the like may be used, and a particular arbitration scheme is not critical to the present invention. In one embodiment, input arbiter 402 forwards up to one request per clock cycle to each of read queue 406 and write queue 404.

Read queue 406 and write queue 404 may be implemented using conventional techniques for queuing requests in the order received. As described below, in some embodiments requests may be removed out-of-order from queues 406 and 404.

Write combiner 408 includes merging logic 420, a timer 422 and send control logic 424. Merging logic 420 examines new requests as they are received to determine whether they can be merged with a current request, e.g., the oldest request in write queue 404 (plus any requests that have already been merged with the oldest request). A specific implementation of merging logic 420 is described below. Send control logic 424 uses status information provided by merging logic 420 to determine whether a packet is to be sent. Send control logic 424 may be configured to detect a variety of conditions under which a packet is to be sent; examples are described below. When a packet is to be sent, send control logic 424 generates the packet from the current request(s) identified by merging logic 420. In some embodiments, send control logic 424 also reformats the request(s) into the packet format specified by the bus protocol. Once a packet is formed, send control logic 424 forwards the packet to output arbiter 416 and removes all requests that were included in the packet from write queue 404. Timer 422 is advantageously used by send control logic 424 to prevent requests from waiting too long in write queue 404, as described below.

Similarly, read combiner 412 includes merging logic 426, a timer 428 and send control logic 430. Merging logic 426 examines new requests as they are received to determine whether they can be merged with a current request, e.g., the oldest request in read queue 406 (plus any requests that have already been merged with the oldest request). A specific implementation of merging logic 426 is described below. Send control logic 430 uses status information provided by merging logic 426 to determine whether a packet is to be sent. Send control logic 430 may be configured to detect a variety of conditions under which a packet is to be sent; examples are described below. When a packet is to be sent, send control logic 430 generates the packet from the current request(s) identified by merging logic 426. In some embodiments, send control logic 430 reformats the request(s) into the packet format specified by the bus protocol. Once a packet is formed, send control logic 430 forwards the packet to output arbiter 416 and removes all requests that were included in the packet from read queue 406. Timer 428 is advantageously used by send control logic 430 to prevent requests from waiting too long in read queue 406, as described below.

Write combiner 408 and read combiner 412 advantageously communicate to each other information about the target devices and target addresses of packets in their respective queues, e.g., so that order can be preserved between a read request and a write request with the same target address. For instance, suppose that a core sends (in order) a first request to read data from address range [A0, A1), a second request to write data to address range [A1, A2), and a third request to read data from address range [A1, A2). Before merging the two read requests, read combiner 412 detects the existence of the intervening write request based on information communicated from write combiner 408. In one embodiment, read combiner 412 merges the two read requests and holds the merged request (i.e., does not deliver it to output arbiter 416) until after the intervening write request has been sent. Alternatively, read combiner 412 might send the first request without merging the second request; this option may be preferable, e.g., if sending of the write request is delayed.

Output arbiter 416 receives packets carrying write requests from write combiner 408 and packets carrying read requests from read combiner 412. In one embodiment, each of write combiner 408 and read combiner 412 delivers at most one packet to arbiter 416 on each clock cycle. Where only one of the combiners provides a packet, output arbiter 416 forwards the packet to driver 418. Where both combiners provide packets, output arbiter 416 may employ conventional arbitration logic to select between them (e.g., least recently serviced or priority-based arbitration algorithms). Output arbiter 416 may include FIFOs or other buffer circuits to temporarily store packets until they are selected for transmission.

Driver circuit 418 receives the selected packet from output arbiter 416 and drives the packet onto bus lines 113a in accordance with the bus protocol. Driver circuit 418 may be of generally conventional design. In some embodiments, the bus includes multiple signal lines 113a, and driver circuit 418 drives at least some of the data bits comprising the packet in parallel onto these lines.

It will be appreciated that the transmitter module described herein is illustrative and that variations and modifications are possible. The read queue and write queue may be of any size and may be implemented in physically or logically separate circuits. The read combiner and write combiner may have identical or different configurations, and in some embodiments, combining requests might be performed only for read requests or only for write requests. In embodiments where the bus protocol does not include a dedicated path for transmitting data, the output arbiter or another component of the transmitter module may be configured to obtain control of the bus in a manner consistent with the applicable bus protocol prior to transmitting a packet, as is known in the art. Further, while the transmitter module is described herein with reference to particular functional blocks, it is to be understood that the blocks are defined for convenience of description and need not correspond to physically distinct components.

Figure 5:
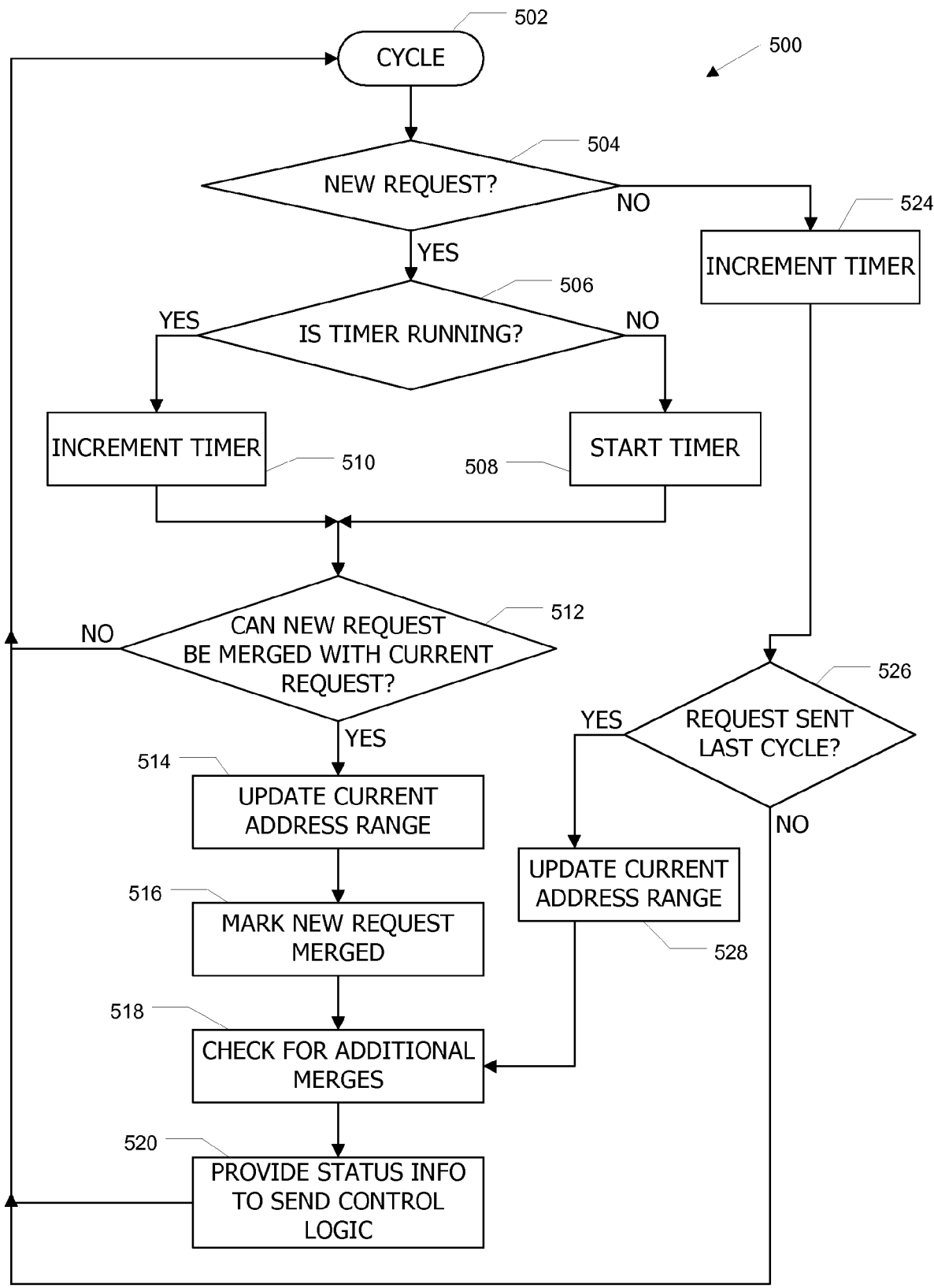
FIG. 5 is a flow diagram showing a control logic process that may be implemented in a merging logic block according to an embodiment of the present invention.

Merging logic blocks 420 and 426 will now be described. FIG. 5 is a flow diagram showing a control logic process 500 that may be implemented in merging logic block 426 of read combiner 412 and/or merging logic block 420 of write combiner 408 according to an embodiment of the present invention. Process 500 may be repeated, starting from "cycle" step 502. In some embodiments, execution of process 500 is synchronized to a clock, which may be further synchronized to operation of bus 106.

In this embodiment, an "active window" is defined in read queue 406 (or write queue 404) to identify requests that are currently candidates for merging. The active window has a predetermined maximum size $M_W$ that is advantageously measured in number of requests. For example, $M_W$ might be 2, 3, 4 or any size up to the total size of read queue 406. At any given time, the $M_W$ oldest requests in read queue 406 are in the active window.

Initially, read queue 406 is empty. As described above, during operation, input arbiter 402 adds zero or more requests to read queue 406 on each cycle. At step 504, merging logic 426 checks read queue 406 to determine whether a new request has been received. If so, then at step 506 merging logic 426 determines whether timer 428 is already running and, if not, starts timer 428 at step 508. In one embodiment, timer 428 can be implemented using a counter that can be incremented or reset on each clock cycle, and starting the timer includes resetting the counter so that it can be incremented as indicated below. If, at step 506, timer 428 is already running, then timer 408 is incremented at step 510.

At step 512, merging logic 426 determines whether the new request can be merged with a current request. The "current request" is advantageously defined by reference to an address range. When the first request is received, the current address range is initialized to the address range of that request. Thereafter, each time a packet is sent, the current address range is reinitialized to the address range of the oldest request in the queue. Until such time as a packet is sent, merging logic 426 can expand the current address range by merging address ranges of subsequent requests into the current address range if those ranges happen to be contiguous with the current address range.

Accordingly, step 512 includes comparing the address range of the new request to the current address range to determine whether merging is possible. In some embodiments, "mergeable" address ranges advantageously include address ranges that represent contiguous blocks in the same address space, so that merging enlarges the address range. In addition, mergeable address ranges may also include address ranges that overlap partially or completely. Thus, a request for address range [A0, A2) is mergeable with a request for address range [A1, A2) or with a second request for address range [A0, A2). Where address ranges of different requests overlap, transmitter module 206 (FIG. 2) advantageously identifies to receiver module 208 the specific range requested by each one of cores 202, and receiver module 208 delivers the appropriate data to each requesting core 202.

In some embodiments, merging may change either the starting or ending addresses. In other embodiments, the starting address is not changed by merging, and only requests whose target addresses correspond to larger address values are considered mergeable at step 512. In still other embodiments, the ending address is not changed by merging, and only requests whose target addresses correspond to smaller address values are considered mergeable at step 512. In addition, merging may also be limited to requests that target the same device. In some embodiments, requests from different cores might or might not be considered mergeable.

If the new request can be merged, then at step 514, the current address range is updated to reflect the merged request. The current address range may be represented, e.g., by a starting address (e.g., the lowest address value to be accessed) and a range size or by a starting address and ending address (e.g., the lowest and highest address values to be accessed); updating the current address range may include changing the starting address, ending address and/or range size to reflect the concatenated address range of the original current request and the new request.

At step 516, the new request is marked as merged. In some embodiments, requests in the queue may be modified to reflect merges. In other embodiments, the requests are not modified, and flags or similar data structures may be used to identify which requests are being merged. More specifically, in one embodiment, a one-bit register corresponding to each location in the window is provided. The register value may be initialized to a logic low value to indicate that the request has not been merged and set to a logic high value at step 516 to that the request has been merged.

At step 518, merging logic 426 checks for additional merges that may be possible after merging the new request. For example, if a first request has address range [A0, A1) and a second request has address range [A2, A3), no merge is possible. But if a third request with address range [A1, A2) is received and merged with the first request to create a current address range [A0, A2), it becomes possible to merge the second request as well to create a current address range [A0, A3). Step 518 advantageously includes detecting such situations and performing additional merging.

Figure 6:
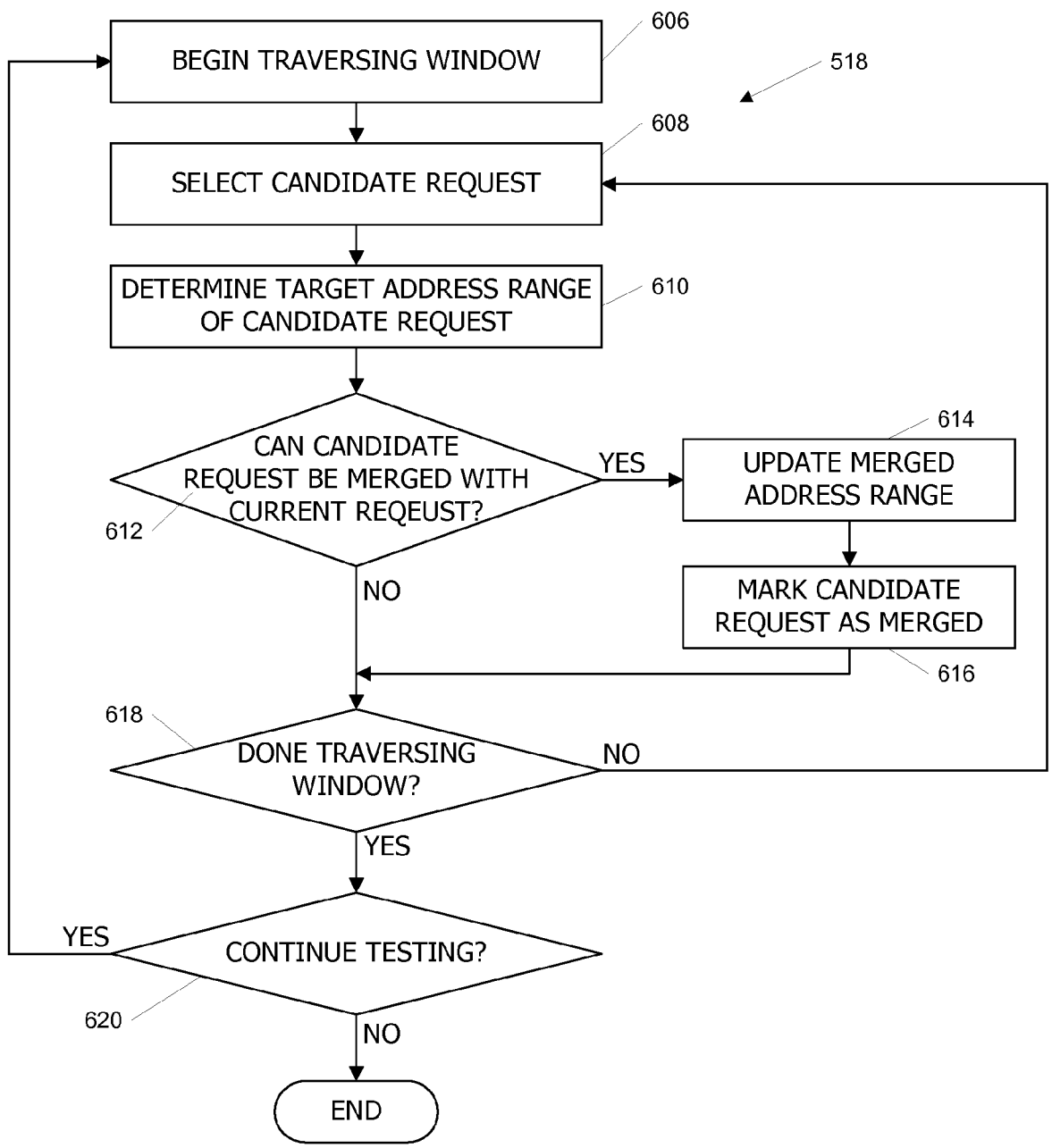
FIG. 6 is a flow diagram of process steps for merging additional requests according to an embodiment of the present invention.

FIG. 6 is a flow diagram of processing that may be performed at step 518 to merge additional requests. Beginning at step 606, process 600 traverses the active window to identify any unmerged requests therein whose address ranges are contiguous with the current merged address range. At step 608 a candidate request is selected. The candidate request is advantageously the oldest request in the active window that has not already been marked as merged. At step 610, the target address of the candidate request is determined.

At step 612, it is determined whether the target address range of the candidate request is mergeable with the current merged address range. The same criteria for merging used at step 512 are advantageously used at step 612. If the address ranges are mergeable, then the merged address range is updated at step 614, and the candidate request is marked as merged at step 616. These steps may be generally similar to steps 514 and 516 described above.

At step 618, regardless of whether the candidate request was merged, it is determined whether any unmerged requests in the window have not been tested. If so, then the next such request is selected as a new candidate request at step 608 and tested as described above.

At step 620, it is determined whether testing should continue. For instance, if any requests were merged during traversal of the window, it is possible that additional unmerged requests might now be mergeable with the expanded address range. If testing should continue, process 600 returns to step 606 to begin a new traversal of the window; otherwise, process 600 exits. It will be appreciated that the specific steps shown in FIG. 6 are not required.

Referring again to FIG. 5, checking for additional merges at step 518 can reduce the dependence of merging on the order in which requests arrive. For example, suppose that the oldest request in the active window has a target address range [A0, A1), the next oldest request has an address range [A2, A3), and the third oldest request has an address range [A1, A2). At steps 512-516 of process 500 the first request would be merged with the third request to create a merged address range [A0, A2). At step 518, the second request would be merged with the merged request to create a merged address range [A0, A3). It should be noted that step 518 is optional, and in some embodiments, simplifying the merging logic may be a higher priority than the increased likelihood of merging requests that step 518 provides.

At step 520, merging logic 426 provides updated status information to send control logic 430. The status information may include any information that is usable by send control logic 430 in determining whether to send a packet during the current cycle. Examples of status information include the total number of requests in the window, the number of requests merged into the current request, the size of the current address range, and so on.

In the case where no new request is received at step 504, merging logic 426 increments timer 428 at step 524. At step 526, merging logic 426 determines whether a packet was sent on the last cycle; step 526 may include detecting a signal generated by send control logic 430 as described below. If a packet was sent, the packet would have included the oldest request in the queue, so the current address range is no longer accurate. At step 528, the current address range is updated to reflect the address range of the request that is now the oldest in read queue 406. Merging logic 426 advantageously checks for other requests in queue 406 that can be merged with the now-oldest request (step 518).

Figure 7:
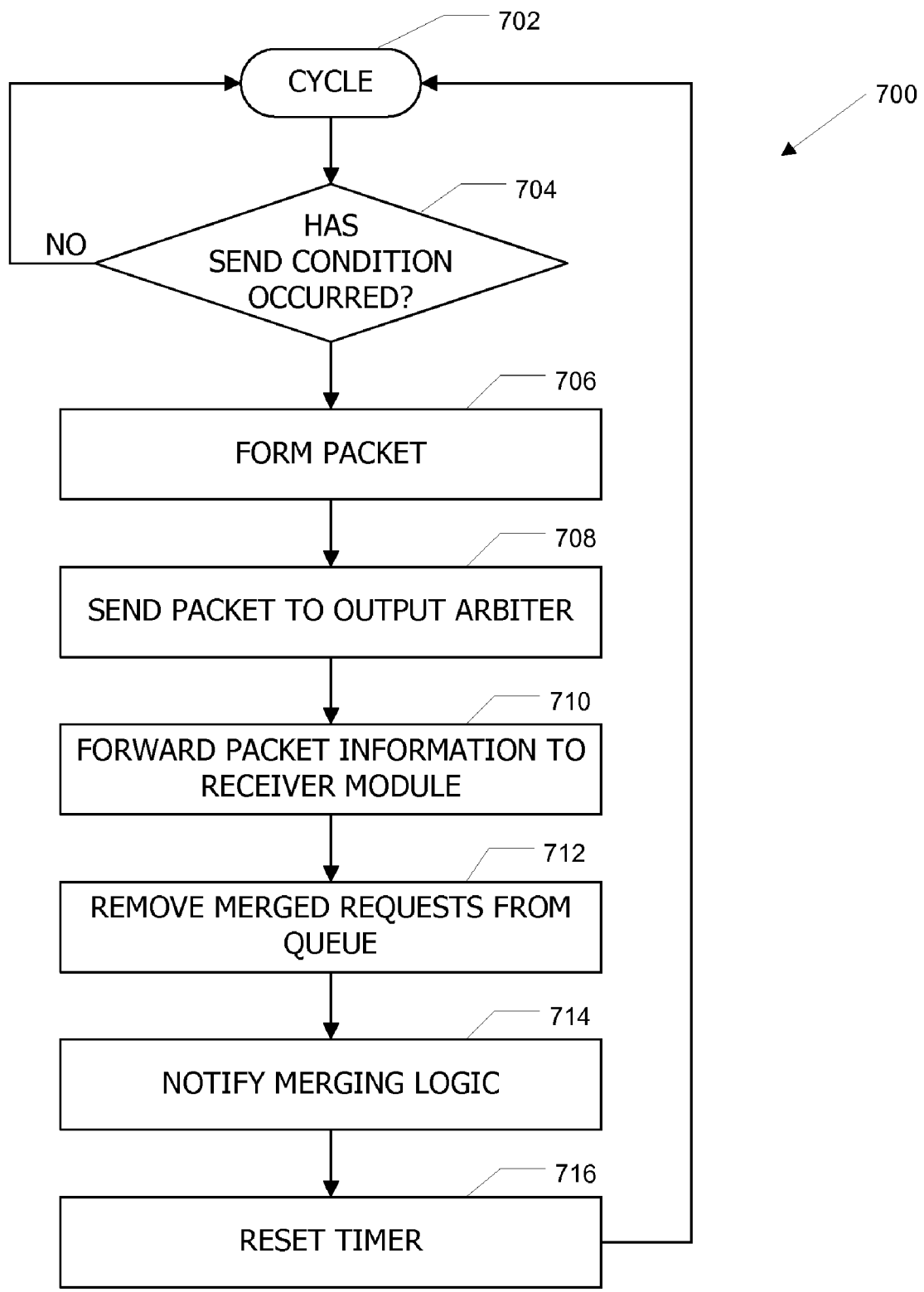
FIG. 7 is a flow diagram showing a control logic process that may be implemented in a send control logic block according to an embodiment of the present invention.

Send control logic blocks 424 and 430 will now be described. FIG. 7 is a flow diagram showing a control logic process 700 that may be implemented in send control logic block 430 of read combiner 412 or send control logic block of write combiner 408 according to an embodiment of the present invention. Process 700 may be repeated, starting from "Cycle" step 702.

At step 704 send control logic 430 (or send control logic 424) determines whether a send condition has occurred. As used herein, a "send condition" refers generally to any detectable condition whose occurrence indicates that a packet should be sent from read queue 406 (or write queue 404). Send conditions are advantageously defined and tuned to a particular system configuration and may take into account such considerations as the size of read queue 406, the maximum latency to be introduced by transmitter module 206, actual levels of bus activity, and so on. A variety of send conditions may be used, and an embodiment of the invention may test any number and combination of send conditions at step 704.

For example, in some embodiments, a send condition occurs when timer 428 (or timer 422) expires, e.g., when the counter implementing timer 428 has reached a predetermined maximum (or, in some embodiments, minimum) value. That value, (which defines a "holdoff time" for a request) is advantageously defined such that expiration of timer 428 occurs when waiting longer would introduce latency that is not expected to be offset by the efficiency gain from merging requests. In some embodiments, the holdoff time may be a fixed value, which can be a configurable parameter of the device. In other embodiments, the holdoff time can be dynamically tuned based on operating conditions, e.g., by monitoring bus traffic and selecting a shorter holdoff time to reduce latency when the bus is relatively lightly loaded and a longer holdoff time to increase the likelihood of combining packets when the bus is heavily loaded. Examples of techniques for dynamically adjusting a holdoff time are described below.

In some embodiments, send conditions are based on properties of the request queue and/or the bus protocol. For example, as described above, in some embodiments, an active window is defined in read queue 406 to identify requests that are currently candidates for merging. The active window has a predetermined maximum size $M_W$ that is advantageously measured in number of requests. For example, $M_W$ might be 2, 3, 4 or any size up to the total size of read queue 406. At any given time, the $M_W$ oldest requests in read queue 406 are in the active window. (If fewer than $M_W$ requests are present in read queue 406, then all requests would be in the active window.)

Once the active window is full, i.e., once read queue 406 includes $M_W$ requests, then continuing to wait for requests is no longer worthwhile (even if the timer has not expired) since no new requests can enter the active window until a packet has been sent. Thus, a full active window is advantageously detected as a send condition. For instance, if $M_W$=2, once two requests have been received, the first request should be sent. If the target address range of the second request is contiguous with the target address range of the first request, the requests would be merged as described above. Otherwise, the second request remains in the queue until a send condition occurs in a subsequent cycle.

In another embodiment, a send condition is based on a maximum number $M_R$ of requests that can be merged; $M_R$ can be any size up to the window size $M_W$. If the first (oldest) request in queue 406 can be merged with $M_R$−1 other requests, it is advantageous not to wait longer before forming and sending the packet. For example, in one such embodiment, $M_W$=3 and $M_R$=2; if the oldest request can be merged with the second oldest request, the send condition on $M_R$ would occur, and a packet would be sent regardless of whether a third request had been received. It will be appreciated that where $M_R$=$M_W$ and a send condition based on $M_w$ is used, a send condition based on $M_R$ would be redundant in the sense that the $M_R$-based send condition would occur only in situations where the $M_W$-based send condition would also occur.

In still another embodiment, a send condition is based on a maximum packet size supported by the bus. Once a packet of the maximum size can be created by merging requests in the active window, no further requests can be merged with the existing requests without creating an unacceptably large packet. For example, suppose that the bus protocol limits the payload of a packet to 128 bytes. If the first (oldest) request in queue 406 has a 128-byte payload (or requests 128 bytes of data), then it cannot be merged into a larger packet, and the packet-size send condition would occur. Similarly, if the first (oldest) request in queue 406 is 64 bytes and can be merged with another 64-byte request to make a packet with a 128-byte payload, then the packet-size send condition would also occur. It is to be understood that the example of a 128-byte maximum is illustrative; different bus protocols may place different limits (or no limits) on packet size. Further, in some embodiments, the maximum packet size that can be created by merging might be set to a smaller size than the maximum size supported by the bus protocol.

In yet another embodiment, certain requests might be defined as "unmergeable," based on some property of the request. For instance, requests from a particular client (core 210), requests to a particular target device or target address range, and/or requests having a particular size might be defined as unmergeable. When the oldest request in queue 406 is unmergeable, no advantage (in terms of merging packets) is gained by waiting to send it; accordingly, a send condition may occur when the oldest request in queue 406 is an unmergeable request.

Referring again to FIG. 7, step 704 may include detecting any combination of the above or other send conditions. If, at step 704, no send condition has occurred, then process 700 returns to step 702 without taking any action. If occurrence of a send condition is detected, a packet is formed at step 706. In one embodiment, send control logic 430 forms the packet by reference to the current address range determined by merging logic 426 described above. Forming a packet may include generating a new header or, in embodiments where the requests are already formatted as packets, modifying information such as the address range in the header of one packet to incorporate information from any other packets being merged with it. Creating a packet may also include concatenating the payloads of the requests (or packets) being merged; payloads are advantageously concatenated based on the order of addresses, which is not necessarily the order of the requests in the window. In some embodiments, payloads may be concatenated as mergeable requests are identified (e.g., at step 514 of process 500 of FIG. 5) rather than waiting until step 706. At step 708, the packet is sent to output arbiter 416 for transmission onto the bus.

At step 710, packet information is forwarded to receiver module 208 (FIG. 2). The packet information advantageously includes the unique packet tag, identification of which one (or ones) of cores 202(1) to 202(N) requested the data, and any other information that may be used by receiver module 208 to determine how to handle any received response to the packet. Such information may be generally conventional in nature, and receiver module 208 is not required to know whether a particular packet was created by merging requests except to the extent that different subsets of the data received in response are to be routed to different requesting cores.

At step 712, send control logic 430 removes all requests that were included in the packet from read queue 406. In one embodiment, the merge register values described above are used to determine which requests were included in the packet.

At step 714, send control logic 430 signals to merging logic 426 that a packet has been sent. In response to this information, merging logic 426 can update the current address range to reflect that a different request is now the oldest request, as described above. At step 716, send control logic 430 resets timer 428. Process 700 then returns to step 702 for the next cycle.

It will be appreciated that the merging and sending processes described herein are illustrative and that variations and modifications are possible. Steps described as sequential may be executed in parallel, order of steps may be varied, and steps may be modified or combined. For instance, the active window may have any size (2 requests or larger) and may be traversed any number of times (once, twice, etc.). In some embodiments, if a maximum packet size or maximum number of merged requests is reached, traversal of the window is discontinued. In some embodiments, certain address ranges might not be allowed; for instance, if the allowed payload sizes are 32, 64 and 128 bytes, a 32-byte request and a 64-byte request would not be merged to create a 96-byte payload. The processes described herein be modified to address any such constraints.

Additionally, the send conditions may differ from those described above. For instance, the timer described above resets each time a packet is sent, and as a result, the number of cycles that a given request waits in the queue might depend in part on whether other packets are being sent. In one alternative embodiment, a separate timer (e.g., a counter) is used for each request, and a request is sent when its timer expires, regardless of other activity. More generally, any number and combination of send conditions may be tested by the send control logic. In some embodiments, requests from certain cores might be sent without waiting. For example, if one core is designated as high priority, receipt of a request from that client might be treated as a send condition, and the packet former logic might be configured to detect such a request and send it as a packet regardless of whether other packets are waiting in the queue. The process described herein may be performed to combine read requests and/or to combine write requests. As noted above, different logic may be used to control combining of read requests and combining of write requests.

In another embodiment, merging logic (e.g., process 500) does not identify mergeable requests on each cycle. Instead, the read combiner (or write combiner, as the case may be) waits until a send condition occurs. When a send condition occurs, the merging logic is invoked to determine whether any of the requests presently in the window can be merged with the oldest request.

In addition, while the merging and sending processes have been described with reference to components of read combiner 412 of FIG. 4, it is to be understood that the same or similar processes may also be implemented in write combiner 408 of FIG. 4 or in other read combiner and/or write combiner circuits.

Figure 8:
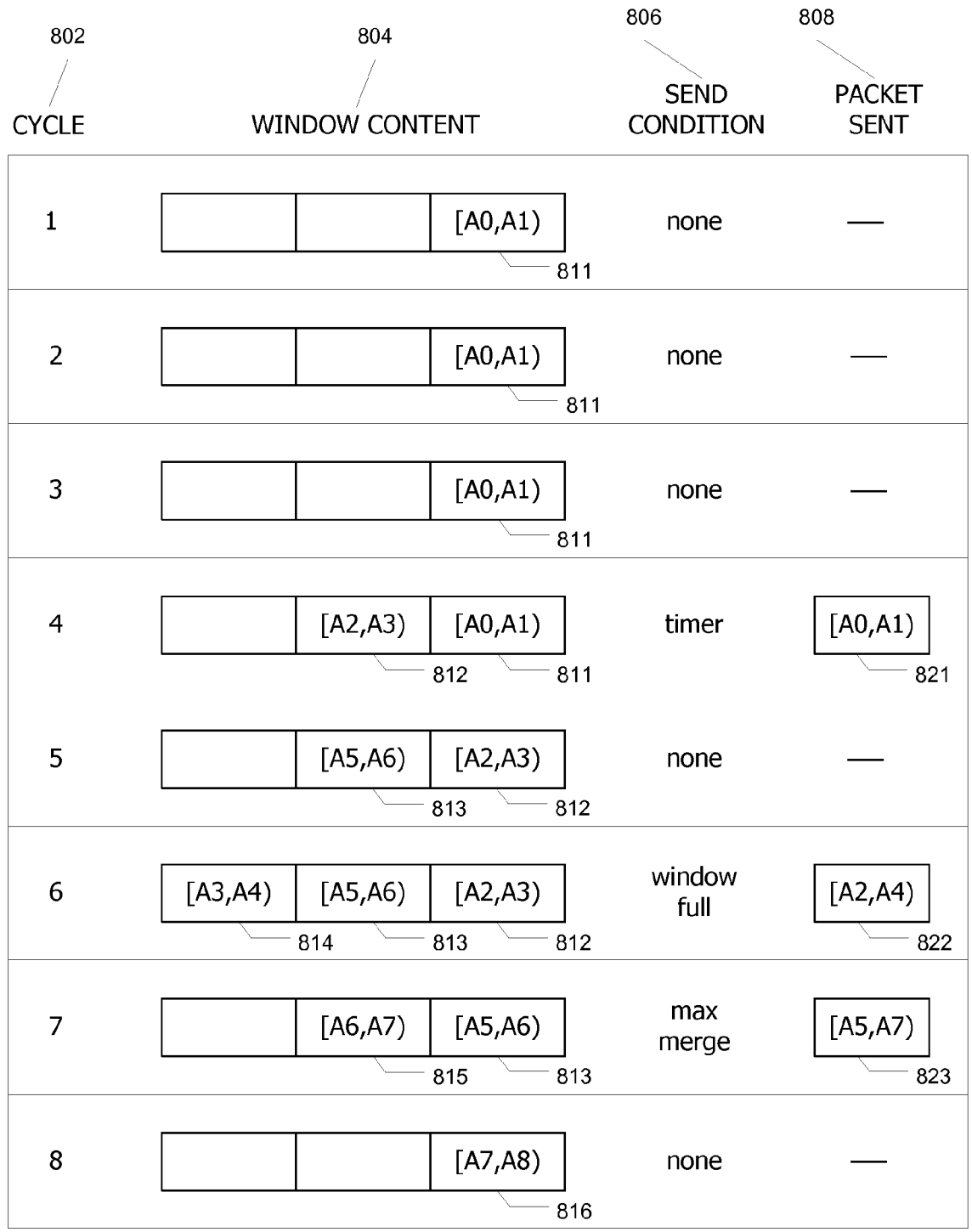
FIG. 8 is an example of processing for a sequence of requests according to an embodiment of the present invention.

To further illustrate the operation of one embodiment of the invention, FIG. 8 is an example of processing for a sequence of requests that might be received by transmitter module 206 (FIG. 2) and processed in accordance with the processes described above. In FIG. 8, column 802 identifies cycles (numbered 1-8 for convenience). Column 804 shows the address ranges of the requests in the active window during each cycle, after receipt of any new requests. Column 806 indicates which, if any, send condition occurs on each cycle. For purposes of this example, the send conditions are: "timer," which expires if the timer reaches a count of 3; "window full," which occurs when three requests are in the window ($M_W=3$); and "max merge," which occurs when two mergeable requests are present in the window ($M_R=2$). Column 808 indicates the address range for a packet (if any) sent during that cycle.

During cycle 1, a first request 811 with target address range [A0, A1] is received and enters the active window. The timer is started at an initial value of zero. No send condition occurs, so no packet is sent. During cycles 2 and 3, no requests are received, and the first request 811 waits in the active window. The timer increments once per cycle.

During cycle 4, a second request 812 with target address range [A2, A3] is received and enters the active window. The timer reaches a count of 3 and expires, so a packet 821 is sent. As described above, the packet corresponds to the oldest request in the window (request 811); since [A0, A1] and [A2, A3] are not contiguous ranges, request 812 is not merged with request 811, and packet 821 has the target address range [A0, A1]. Since a packet is sent, the timer is reset.

During cycle 5, a third request 813 with target address range [A5, A6] is received and enters the active window. No send condition occurs, so no packet is sent.

During cycle 6, a fourth request 814 with target address range [A3, A4] is received and enters the window. Since the window is now full, a send condition occurs, and a packet 822 is sent. In this instance, the oldest request is request 812, and request 814 is merged with request 812. Thus, packet 822 has the target address range [A2, A4]. Request 813 is not merged and remains in the window.

At cycle 7, a fifth request 815 with target address range [A6, A7] is received and enters the window. Since request 815 can be merged with request 813, a "max merge" send condition occurs, and a packet 823 is sent. Packet 823 has the target address range [A5, A7] due to merging.

At cycle 8, a sixth request 816 with target address range [A7, A8] is received and enters the window. At this point, request 816 is the only request in the window, and no send condition occurs so no packet is sent. This process can be continued in this manner indefinitely.

It will be appreciated that the sequence of events and send conditions described herein is illustrative and that variations and modifications are possible. Different send conditions may be defined, and different rules may be used to determine whether requests can be merged.

In the example shown in FIG. 8, merging reduces the number of packets sent on the bus from five (the number of requests) to three. More generally, the bandwidth that can be gained by merging requests depends in part on the particular send conditions and merging rules implemented. It also depends in part on the extent to which the requests generated by the various cores or other clients of the bus interface unit tend to have contiguous target address ranges, which depends on the type of operations being performed by the clients. As noted above, as long as the merged packet is smaller than the combined size of the two or more packets from which the merged packet was created, at least some reduction in bandwidth usage is attained. Further, where multiple requests are merged into one packet, the response will more likely be returned in one packet rather than multiple packets, thereby reducing bandwidth usage on the return path.

In addition, merging of packets can provide other benefits. For instance, in some embodiments, power consumption is reduced by placing driver circuit 418 (FIG. 4) in a low power state when it is not transmitting packets; accordingly, reducing the number of packets transmitted by driver circuit 418 can reduce power consumption. As another example, in embodiments where bus interface unit 204 (FIG. 2) uses tags to keep track of request packets for which a response has not been received, merging requests into a smaller number of packets can reduce the number of tags that need to be tracked.

Referring again to FIG. 4, in some embodiments of the present invention, timer 428 of read combiner 412 and/or timer 422 of write combiner 408 are used to implement dynamically adjustable holdoff times as a send condition. That is, rather than waiting for a fixed number of cycles after receiving a packet, read combiner 412 or write combiner 408 can wait a variable number of cycles before deciding to send a packet regardless of whether any mergeable requests have been received. The holdoff time is advantageously determined based on activity on the bus via which requests and responses are communicated.

Figure 9A:
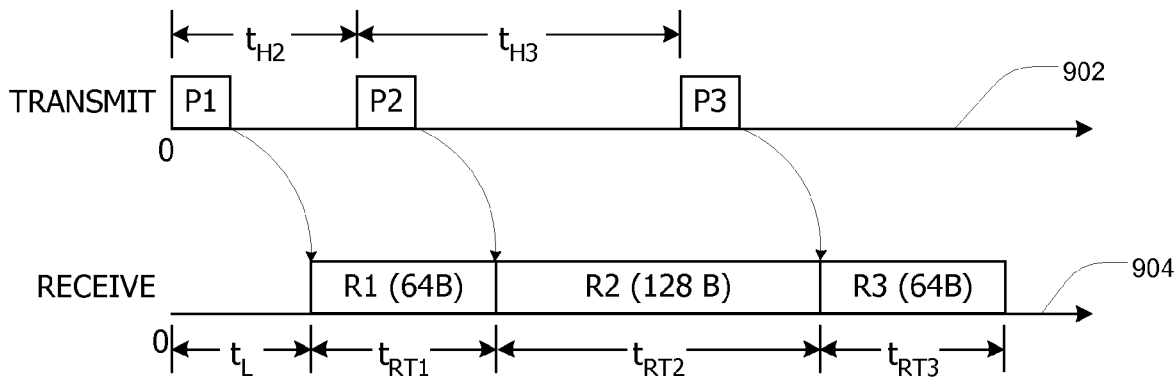
FIGS. 9A-9B are timeline views illustrating an operating principle for a dynamically-adjustable holdoff time for merging requests according to an embodiment of the present invention.
Figure 9B:
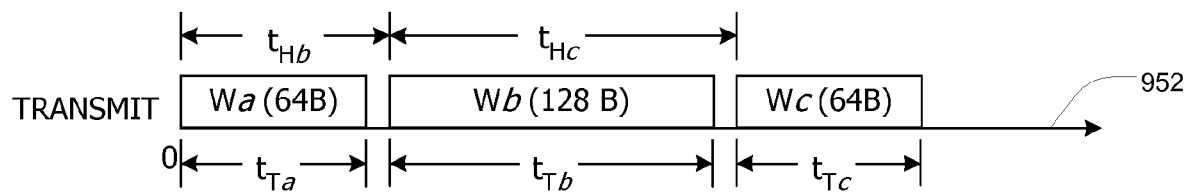

FIGS. 9A and 9B illustrate an operating principle for dynamically adjusting holdoff times for read requests and write requests, respectively, according to embodiments of the present invention. FIG. 9A depicts a timeline 902 showing read request packets sent on transmit link 113a (FIG. 2) and a timeline 904 for response packets sent on receive link 113b (FIG. 2).

In timeline 902, packets P1, P2 and P3 are read requests packets formed by read combiner 412 of FIG. 4. As described above, each packet may include a single request or multiple merged requests, depending on what requests were received while read combiner 412 waited to send each packet. From the perspective of increasing the likelihood that a mergeable request will be received, waiting longer is desirable. However, waiting longer can also lead to longer delays in receiving the response data, which can adversely affect system performance.

In one embodiment, the holdoff time is dynamically adjustable such that each packet is delayed as long as possible without introducing added delay. This principle is illustrated in FIG. 9A. At a time t=0, a first packet P1 is transmitted to a target device. In this example, packet P1 is a request to read 64 bytes of data. After a holdoff time $t_{H2}$, a second packet P2 is transmitted; in this case, a request to read 128 bytes of data. After another holdoff time $t_{H3}$, a third packet P3 is transmitted; in this case, a request to read 64 bytes. The holdoff times $t_{H2}$ and $t_{H3}$ are advantageously determined based on the amount of time required to return a response to previous packets.

The time required to return responses to packets P1-P3 is shown on receiver timeline 904. Response packets R1, R2 and R3 are responses to request packets P1, P2 and P3, respectively. Thus, response packets R1 and R3 each include 64 bytes of data, while response packet R2 includes 128 bytes. Each response packet occupies receive link 113b for a "return transfer" time period $t_{RT1}$, $t_{RT2}$, $t_{RT3}$ that depends on the size of the packet (which, in turn, depends on the amount of data in the packet). In one embodiment using PCI-E, $t_{RT1}$ and $t_{RT3}$ are each about 21 ns while $t_{RT2}$ is about 37 ns.

Delivery of the first response packet R1 commences a time $t_L$ after request packet P1 is sent. Time $t_L$ represents a system latency that includes contributions from the bus as well as the target device. Delivery of response R1 is complete at time $t_L+t_{RT1}$. Consequently, as long as the bus protocol guarantees that responses to requests are returned to the requesting device in the same order in which the requests were sent, a response R2 to packet P2 cannot be delivered until delivery of response R1 is complete. In other words, delivery of response R2 does not commence any earlier than time $t_L+t_{RT1}$. (It is to be understood that response R2 might be further delayed, depending on various system conditions, and such delays might or might not be predictable.) Similarly, delivery of response packet R3 does not commence any earlier than time $t_L+t_{RT1}+t_{RT2}$.

Consequently, after packet P1 has been sent, it is expected that sending packet P2 prior to time $t_{RT1}$ will not result in data being returned any sooner than if packet P2 were held back until time $t_{RT1}$. Accordingly, after packet P1 is sent, packet P2 is held back for a time $t_{H2}$ approximately equal to $t_{RT1}$. During that time, if read combiner 412 (FIG. 4) receives any requests that are mergeable with the oldest request in its active window, those requests can be merged into packet P2. Similarly, after packet P2 is sent, packet P3 is held back for a time $t_{H3}$ approximately equal to $t_{RT2}$. It should be noted that if requests P1 and P2 are for different amounts of data, holdoff times $t_{H2}$ and $t_{H3}$ are advantageously different from each other.

FIG. 9B depicts a timeline 952 showing write request packets sent on transmit link 113a (FIG. 2). In the case of write requests in this embodiment, any response packets sent on receive link 113b (FIG. 2) are small, fixed-size packets that do not affect the dynamic holdoff time.

In timeline 952, packets Wa, Wb and Wc are write requests packets formed by write combiner 408 of FIG. 4. As described above, each packet may include a single request or multiple merged requests, depending on what requests were received while write combiner 408 waited to send each packet. Each packet includes a payload carrying the data to be written. As noted above, from the perspective of increasing the likelihood that a mergeable request will be received, waiting longer is desirable; however, waiting longer can also lead to longer delays in writing the data, which can adversely affect system performance.

In one embodiment, the holdoff time is dynamically adjustable such that each packet is delayed as long as possible without introducing added delay. This principle is illustrated in FIG. 9B. At a time t=0, a first packet Wa is transmitted to a target device. In this example, packet Wa is a request to write 64 bytes of data. After a holdoff time $t_{Hb}$, a second packet Wb is transmitted; in this case, a request to write 128 bytes of data. After another holdoff time $t_{Hc}$, a third packet P3 is transmitted; in this case, a request to read 64 bytes. The holdoff times $t_{Hb}$ and $t_{Hc}$ are advantageously determined based on the amount of time required to transfer the preceding write packets.

The time required to transfer each write packet Wa, Wb, Wc is shown below timeline 952. As indicated, write packets Wa and Wc each include 64 bytes of data, while write packet Wb includes 128 bytes. Each write packet occupies transmit link 113a for a "transfer" time period $t_{Ta}$, $t_{Tb}$, $t_{Tc}$ that depends on the size of the packet (which, in turn, depends on the amount of data in the packet). In one embodiment using PCI-E, $t_{Ta}$ and $t_{Tc}$ are each about 21 ns while $t_{Tb}$ is about 37 ns.

Where the bus protocol guarantees that write requests are propagated in order and requires that write requests not be sent until they can move through the bus without delay (as is the case for PCI-E), transmission of write packet Wb cannot be initiated until transmission of write packet Wa is completed. In other words, transmission of packet Wb does not commence any earlier than time $t_{Ta}$. (It is to be understood that transmission of packet Wb might be further delayed, depending on various system conditions; such delays might or might not be predictable.) Similarly, transmission of packet Wc does not commence any earlier than time $t_{Ta}+t_{Tb}$.

Consequently, after packet Wa has been sent, it is expected that sending packet Wb prior to time $t_{Ta}$ will not result in any performance advantage as compared to holding back packet Wb until time $t_{Ta}$. Accordingly, after packet Wa is sent, packet Wb is held back for a time $t_{Hb}$ at least as long as $t_{Ta}$. During that time, if write combiner 408 (FIG. 4) receives any requests that are mergeable with the oldest request in its active window, those requests can be merged into packet Wb. Similarly, after packet Wb is sent, packet We is held back for a time $t_{Hc}$ at least as long as $t_{Tb}$. It should be noted that if packets Wa and Wb transfer different amounts of data, holdoff times $t_{Hb}$ and $t_{Hc}$ are advantageously different from each other.

In accordance with an embodiment of the present invention, a holdoff time for each successive read request packet and/or each successive write request packet is dynamically determined based on when previous read request packets were sent and how much data was requested by those packets.

Figure 10:
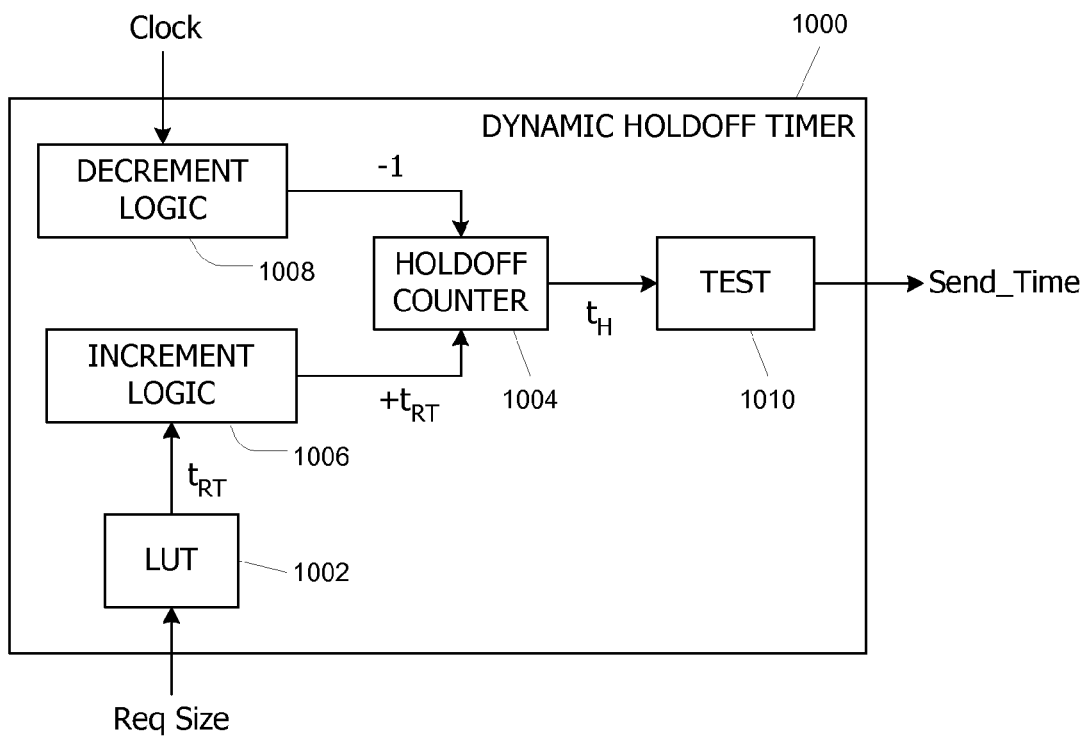
FIG. 10 illustrates a dynamic holdoff timer that can be used to dynamically adjust a holdoff time according to an embodiment of the present invention.

FIG. 10 illustrates a dynamic holdoff timer 1000 that can be implemented as timer 428 in read combiner 412 (or write combiner 408) according to an embodiment of the present invention. Dynamic holdoff timer 1000 includes a lookup table (LUT) 1002, a holdoff counter 1004, increment logic 1006, decrement logic 1008, and a test unit 1010. Holdoff counter 1004 stores a current value of a holdoff time ($t_H$) and is used as a dynamically adjustable countdown timer, as described below.

Lookup table 1002 stores a delay-time value ($t_D$) corresponding to each allowed request size. The delay time $t_D$ for a given request size is advantageously based on the amount of time needed to transmit the requested amount of data in a packet on the bus (e.g., the return transfer time $t_{RT}$ shown in FIG. 9A for a read request or the transfer time $t_T$ shown in FIG. 9B for a write request). In some embodiments, delay time $t_D$ may also account for bus overhead associated with the transaction, such as time required to transmit an Ack in PCI-E.

Whenever a packet is sent, lookup table 1002 receives size information for the request (e.g., the amount of data requested by or included in the packet). Using the size information, lookup table 1002 determines the appropriate delay time $t_D$ and delivers $t_D$ to increment logic 1006. Increment logic 1006 adds the value $t_D$ to the current holdoff time $t_H$ stored holdoff counter 1004. Decrement logic 1008 is responsive to a clock signal (Clock), decrementing the holdoff time $t_H$ in holdoff counter 1004 by one for each clock cycle.

Test unit 1010 determines whether the current holdoff time $t_H$ stored in holdoff counter 1004 indicates that a packet should now be sent and accordingly asserts or deasserts a "Send_Time" control signal, which is delivered to send control logic 430 (FIG. 4). In one embodiment, test unit 1010 asserts the Send_Time signal whenever $t_H$ is zero. In one embodiment, assertion of the Send_Time control signal indicates that a timer-expiration send condition has occurred and causes send control logic 430 to send a packet (which, as described above, may include one or more requests).

In some embodiments, test unit 1010 may also apply other conditions. For example, when the holdoff time $t_H$ is zero, transmit link 113a might not be available to send a request. This can occur, e.g., when a holdoff time for read combiner 412 of FIG. 4 reaches zero while driver 418 is still in the process of driving a write packet onto transmit link 113a. To take advantage of such delays, test unit 1010 in some embodiments receives a feedback signal (e.g., from driver circuit 418) indicating whether transmit link 113a is currently available. If transmit link 113a is not available when holdoff time $t_H$ reaches zero, test unit 1010 waits to assert the Send_Time signal until transmit link 113a becomes available. During this additional waiting period, merging logic 420 can continue to merge any additional incoming requests as described above.

Figure 11:
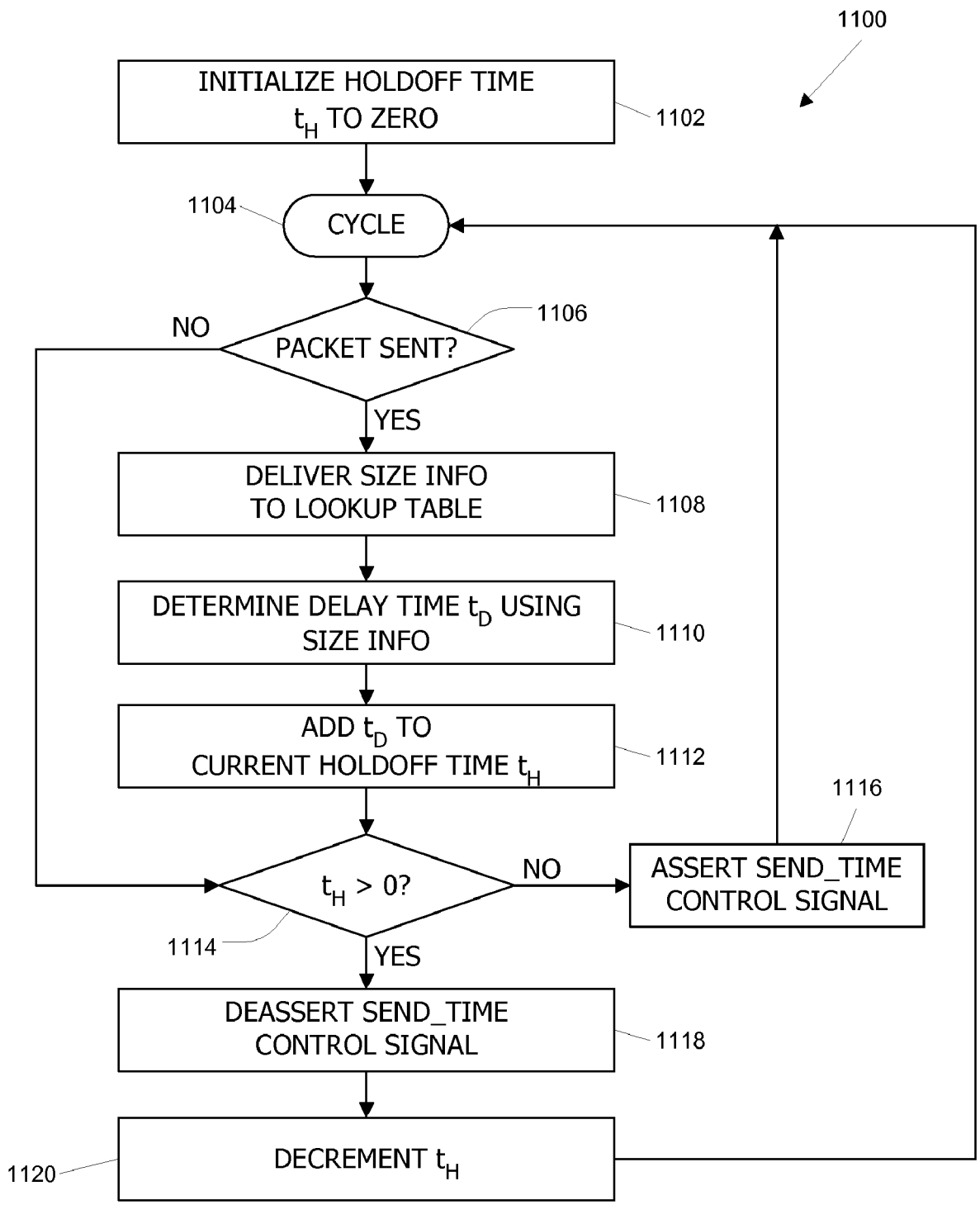
FIG. 11 is a flow diagram of a process for dynamically adjusting a holdoff time according to an embodiment of the present invention.

Operation of dynamic holdoff timer 1000 will now be described with reference to FIG. 11, a flow diagram of a process 1100 for providing a dynamically adjustable holdoff time for a packet combiner according to an embodiment of the present invention. At step 1102, the holdoff time $t_H$ in holdoff counter 1004 is initialized to zero; as described below, this causes test unit 1010 to initially assert the Send_Time control signal.

Process 1100 then enters a loop that is repeated for each clock cycle (step 1104). In the loop, at step 1106, it is determined whether a packet was sent since the last cycle. If no packet was sent, process 1100 jumps to step 1114, where test unit 1010 determines whether the current holdoff time $t_H$ stored in holdoff counter 1004 is greater than zero. Initially, no packet has been sent, holdoff time $t_H$ is still zero, and accordingly, at step 1116, test unit 1010 asserts the Send_Time signal. Process 1100 returns to step 1104 to await the next cycle.

Because the Send_Time control signal, indicating a send condition, is initially asserted, as soon as a first request is received, that request will be sent as a packet. Once the first packet has been sent (step 1106), the size information for that packet is delivered to lookup table 1002 at step 1108. At step 1110, lookup table 1002 determines, based on the request size, the appropriate delay time $t_D$ to add to the current holdoff time $t_H$. At step 1112, increment logic adds time $t_D$ to the current holdoff time $t_H$ stored in holdoff counter 1004. This determines how long the next packet will be held back. At step 1114, holdoff time $t_H$ is determined to be nonzero, and decrement logic 1008 decrements $t_H$ at step 1116. (In this embodiment, $t_H$ is not decremented further once it reaches zero.) Process 1100 then awaits the next cycle 11104.

As process 1100 continues, a nonzero holdoff time $t_H$ in holdoff counter 1004 is decremented by one during each cycle 1104; if no packets are sent, holdoff counter 1004 eventually counts down to zero. At that point, test unit 1010 again asserts the Send_Time signal, and the next packet will be sent.

In one embodiment, when the Send_Time signal is asserted and at least one request is pending, read combiner 412 generates a packet by merging pending requests to the extent possible, as described above. When that packet is sent, read combiner 412 provides corresponding size information to lookup table 1002. Based on the size information, holdoff counter 1004 is incremented to an appropriate holdoff time, and read combiner 412 waits until that time has elapsed before sending the next packet, allowing opportunities for mergeable requests to arrive in read queue 406. If no requests are pending when the holdoff time $t_H$ reaches zero, the Send_Time signal continues to be asserted, and the next request will be sent upon receipt.

It will be appreciated that the dynamic holdoff timer and dynamic adjustment process described herein are illustrative and that variations and modifications are possible. The circuit components shown in FIG. 10 can be implemented using conventional digital circuit techniques or any other techniques, and the particular components may be modified or combined. Process steps described with reference to FIG. 11 as sequential may be executed in parallel, order of steps may be varied, and steps may be modified or combined. In some embodiments, the test at step 1114 may also include testing other conditions, such as whether the bus is available, in addition to the test of the holdoff time.

Delay times stored in lookup table 1002 are advantageously determined based at least in part on characteristics of the bus protocol in use. (E.g., as noted above, in some PCI-E implementations, return transfer times for a 64-byte request and a 128-byte are known to be about 21 ns and about 37 ns, respectively.) In some embodiments, the delay time is the return transfer time. In other embodiments, the delay time is modified from the return transfer time in order to optimize system performance. For instance, it may be desirable to add some number of cycles to account for bus overhead, latency in the target device, or the like, and/or to subtract some number of cycles to ensure that the full capacity of the return path is used. Those skilled in the art will appreciate that optimal delay times associated with various request sizes will be implementation-dependent.

In some embodiments, dynamic holdoff timer 1000 is used in combination with one or more other send conditions, including any of the send conditions described above. For instance, send conditions based on merged request size, fullness of the active window, or the like could be used together with a time-based send condition. Control logic can be provided to test various send conditions and determine whether any send condition has occurred; when a send condition occurs, the control logic signals the packet-forming logic (e.g., merging logic 426 and send control logic 430) to form a packet. If a packet is sent due to any send condition, a delay time $t_D$ associated with the sent packet is advantageously added to the holdoff time $t_H$ even if $t_H$ has not reached zero, postponing the next assertion of the Send_Time signal. In some embodiments, an upper limit may be placed on the holdoff time $t_H$; once the upper limit is reached, additional delay time $t_D$ is not added until at least one packet has been sent.

Persons having ordinary skill in the art will appreciate that a dynamic holdoff time can be applied to read requests, to write requests, or to both types of requests. In the case of write requests, as shown in FIG. 9B, it is the request packet, rather than the response packet, that carries the data. Consequently, the appropriate holdoff time may be more predictable for write requests than for read requests in embodiments where a variable system latency associated with read requests does not affect write requests. In some embodiments, depending on bus protocol and activity levels, it may be desirable to add a small "extra" holdoff time to the holdoff time determined from the packet size of a write packet in order to reduce the likelihood of saturating the bus. This extra holdoff time may be fixed (e.g., at 1-3 clock cycles) or adjustable based on recent bus activity; e.g., where the bus is busier, a longer holdoff time may be desirable.

While the invention has been described with respect to specific embodiments, one skilled in the art will recognize that numerous modifications are possible. For instance, combining requests is not limited to the PCI-E protocol; the techniques described herein may be adapted to any communication protocol via which devices transmit read and/or write requests using packets. The present invention can also be applied to communication between different computer systems (including server and client systems, handheld or mobile devices that send and/or receive data, and so on) where the systems communicate by exchanging packets over a network.

In some embodiments, merging can be enabled or disabled depending on the level of bus activity. For example, send control logic blocks 424 and/or 430 of FIG. 4 might be configured such that when bus activity is below a threshold level, a send condition occurs each time a request is received. This reduces transmitter latency that can be introduced by waiting to determine whether a first request can be merged with a subsequent request. Where bus activity is above the threshold level, other send conditions may be tested, e.g., as described above. The threshold bus activity level may advantageously be set such that merging is enabled when the bus is busy enough that some delay in transmitting requests onto the bus and/or receiving responses to requests via the bus would be expected.

Further, in some embodiments, even after a dynamic or static holdoff time has expired (or some other send condition has occurred), it might not be possible to send additional packets, e.g., due to backpressure that may arise when the bus and/or the target device are in heavy use. Where this is the case, the packet combiner(s) may find further opportunities to merge incoming requests with pending requests during extended waiting periods.

It should be noted that combining multiple requests into a single packet as described herein may be particularly useful in a GPU with no local graphics memory. For example, referring to FIG. 1, a GPU 122 can be implemented in a graphics subsystem 112 that has no graphics memory 124. Where this is the case, GPU 122 can use system memory to store all data. In one embodiment, one or more "frame buffers" are defined in system memory 102. A rendering process of GPU 122 writes pixel data to a frame buffer in system memory 102, and a scanout (display) process of GPU 122 reads pixel data from a frame buffer in system memory 102 for delivery to display device 110. GPU 122 in this configuration may also rely on system memory 102 to provide any auxiliary information needed for rendering and/or display operations, including texture data, shader programs, and the like.

To operate in this "zero frame buffer" configuration, GPU 122 relies on PCI-E or other high-speed link 113 to transfer data to and from system memory 102 fast enough to support rendering and displaying of images in real time. Depending on the particular organization of pixel data in system memory 102, scanout requests (i.e., requests to read data from a frame buffer for delivery to a display device) may exhibit a high degree of locality, in which case merging of requests can considerably reduce bus overhead associated with these requests. Other requests will benefit to the extent that those requests also exhibit locality.

Further, while the embodiments described above relate to a GPU, the present invention is not limited to GPUs or to integrated processors. Any device with a bus interface that manages requests from multiple clients can include suitable components to merge requests. For instance, PCI-E switch 116 of FIG. 1 might also be configured to merge requests from the devices connected thereto.

Thus, although the invention has been described with respect to specific embodiments, it will be appreciated that the invention is intended to cover all modifications and equivalents within the scope of the following claims.

What is claimed is:

1. A bus interface device for transmitting data transfer requests from a plurality of clients as packets on a bus, the device comprising:

a queue configured to store a plurality of data transfer requests from the plurality of clients, each data transfer request specifying a target address range;

control logic configured to generate a send condition signal;

packet forming logic configured to form a packet, in response to the send condition signal, from at least one of the data transfer requests in the queue, the packet forming logic being further configured to combine two or more of the data transfer requests in the queue into one packet in the event that the two or more data transfer requests being combined specify respective target address ranges that are mergeable, wherein the data transfer requests are write requests;

output logic coupled to the packet forming logic and configured to drive the packet onto the bus; and dynamic holdoff timer logic coupled to the packet forming logic and the control logic and configured to determine a holdoff period for a next packet based on a level of bus activity and to detect expiration of the holdoff period, the dynamic holdoff timer logic being further configured to receive size information for a formed packet from the packet forming logic and to dynamically update the holdoff period for the next packet based at least in part on the size information, the size information representing an amount of write data included in the formed packet the control logic being configured to generate the send condition signal in response to expiration of the holdoff period.

2. The bus interface device of claim 1, wherein the dynamic holdoff timer logic is further configured to determine the holdoff period for the next packet based at least in part on a return transfer time associated with the amount of data requested by the formed packet.

3. The bus interface device of claim 1, wherein the dynamic holdoff timer logic is further configured to determine the holdoff period for the next packet based at least in part on a transfer time associated with the amount of write data included in the formed packet.

4. The bus interface device of claim 1 wherein the respective target address ranges specified by two or more data transfer requests are mergeable in the event that the respective target address ranges are contiguous.

5. The bus interface device of claim 4 wherein the respective target address ranges specified by two or more data transfer requests are mergeable in the event that the target address range of an older of the two or more data requests is below a target address range of a newer of the two or more data requests.

6. The bus interface device of claim 4 wherein the respective target address ranges specified by two or more data transfer requests are mergeable in the event that the target address range of an older of the two or more data requests is above a target address range of a newer of the two or more data requests.

7. The bus interface device of claim 1 further comprising:
unmergeable request detection logic coupled to the queue and the control logic, the unmergeable request detection logic being configured to determine whether an oldest data transfer request in the queue satisfies an unmergeability criterion,
wherein the control logic is further configured to generate the send condition signal in the event that the oldest data transfer request satisfies the unmergeability criterion.

8. A method for transmitting data transfer requests from a plurality of clients as packets on a bus, the method comprising:
receiving a first data transfer request specifying a first address range;
detecting whether a holdoff time has elapsed since receiving the first packet, wherein the holdoff time is dynamically adjustable;
in the event that the holdoff time has elapsed, forming a packet for transmission on the bus, wherein forming the packet includes:
determining whether a subsequent data transfer request specifying a second address range mergeable with the first address range was received during the holdoff time;
in the event that a subsequent data transfer request specifying a mergeable second address range was received, merging the first data transfer request and the mergeable subsequent data transfer request into the packet, and
in the event that no subsequent data transfer request specifying a mergeable second address range was received during the holdoff time, including only the first data transfer request in the packet;
transmitting the packet onto the bus; and
adjusting, based on a level of bus activity, the holdoff time for a next packet to be formed, wherein adjusting the holdoff time includes:
determining a delay time associated with the data transfer request; and
adding the delay time to a current holdoff time, thereby adjusting the holdoff time.

9. The method of claim 8 wherein determining the delay time includes:
determining a size parameter corresponding to an amount of data associated with the request; and
based on the size parameter, determining a time required to transfer the amount of data associated with the data transfer request via the bus.

10. The method of claim 8 wherein the first packet includes at least one read request and wherein the delay time is determined based at least in part on an amount of time needed to transfer a response packet including the requested data via the bus.

11. The method of claim 8 wherein the first packet includes at least one write request and wherein the delay time is determined based at least in part on an amount of time needed to transfer the write data via the bus.

12. The method of claim 8 wherein detecting whether the holdoff time has elapsed includes:
decrementing the holdoff time for each cycle of a clock associated with the bus; and
detecting whether the holdoff time is zero.

13. The method of claim 12 wherein detecting whether the holdoff time has elapsed further includes:
in the event that the holdoff time is zero, detecting whether the bus is available to transmit a request,
wherein the holdoff time has elapsed in the event that the holdoff time is zero and the bus is available to transmit a request.

14. A processor comprising:
a plurality of processing cores, each processing core configured to generate data transfer requests; and
a bus interface unit configured to receive data transfer requests from the processing cores and to transmit the data transfer requests as packets on a bus, the bus interface unit including:
a queue configured to store a plurality of data transfer requests from the plurality of clients, each data transfer request specifying a target address range;
control logic configured to generate a send condition signal;
packet forming logic configured to form a packet, in response to the send condition signal, from at least one of the data transfer requests in the queue, the packet forming logic being further configured to combine two or more of the data transfer requests in the queue into one packet in the event that the two or more data transfer requests being combined specify respective target address ranges that are mergeable, wherein the data transfer requests are write requests;
output logic coupled to the packet forming logic and configured to drive the packet onto the bus; and
dynamic holdoff timer logic coupled to the packet forming logic and the control logic and configured to determine a holdoff period for a next packet based on a level of bus activity and to detect expiration of the holdoff period, the dynamic holdoff timer logic being further configured to receive size information for a formed packet from the packet forming logic and to dynamically update the holdoff period for the next packet based at least in part on the size information, the size information representing an amount of write data included in the formed packet, the control logic being configured to generate the send condition signal in response to expiration of the holdoff period.

15. The processor of claim 14 wherein the processor is a graphics processor and the bus interface unit is configured for use with a PCI-Express (PCI-E) bus.

16. The processor of claim 14 wherein the data transfer requests are read requests and wherein the size information represents an amount of data requested by the formed packet.

17. The processor of claim 16 wherein the dynamic holdoff timer logic is further configured to determine the holdoff period for the next packet based on a return transfer time associated with the amount of data requested by the formed packet.

18. The processor of claim 14 wherein the dynamic holdoff timer logic is further configured to determine the holdoff period for the next packet based at least in part on a transfer time associated with the amount of write data included in the formed packet.

19. A bus interface device for transmitting data transfer requests from a plurality of clients as packets on a bias, the device comprising:

a queue for storing a plurality of data transfer requests from the plurality of clients, each data transfer request specifying a target address range, wherein the data transfer requests are read requests;

control logic for generating a send condition signal;

packet forming logic for forming a packet, in response to the send condition signal, from at least one of the data transfer requests in the queue, the packet forming logic also combines two or more of the data transfer requests in the queue into one packet in the event that the two or more data transfer requests being combined specify respective target address ranges that are mergeable;

output logic coupled to the packet forming logic for driving the packet onto the bus; and dynamic holdoff timer logic coupled to the packet forming logic and the control logic, the dynamic holdoff time logic for determining a holdoff period for a next packet based on a level of bus activity and to detect expiration of the holdoff period, wherein the dynamic holdoff timer logic is also receives size information for a formed packet from the packet forming logic and to dynamically update the holdoff period for the next packet based at least in part on the size information, the size information representing an amount of data requested by the formed packet, the control logic also generates the send condition signal in response to expiration of the holdoff period.

20. A processor comprising:

a plurality of processing cores, each processing core for generating data transfer requests; and a bus interface unit for receiving data transfer requests from the processing cores and to transmit the data transfer requests as packets on a bus, the bus interface unit including:

a queue storing a plurality of data transfer requests from the plurality of clients, each data transfer request specifying a target address range, wherein the data transfer requests are read requests;

control logic for generating a send condition signal;

packet forming logic for forming a packet, in response to the send condition signal, from at least one of the data transfer requests in the queue, the packet forming logic also combines two or more of the data transfer requests in the queue into one packet in the event that the two or more data transfer requests being combined specify respective target address ranges that are mergeable;

output logic coupled to the packet forming logic for driving the packet onto the bus; and dynamic holdoff timer logic coupled to the packet forming logic and the control logic, the dynamic holdoff timer logic for determining a holdoff period for a next packet based on a level of bus activity and to detect expiration of the holdoff period, wherein the dynamic holdoff timer logic also receives size information for a formed packet from the packet forming logic and to dynamically update the holdoff period for the next packet based at least in part on the size information, the size information representing an amount of data requested by the formed packet, the control logic being configured to generate the send condition signal in response to expiration of the holdoff period.

* * * * *